US006874052B1

(12) United States Patent
Delmonico

(10) Patent No.: US 6,874,052 B1
(45) Date of Patent: Mar. 29, 2005

(54) EXPANSION BRIDGE APPARATUS AND METHOD FOR AN I²C BUS

(75) Inventor: James J Delmonico, Clinton, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 407 days.

(21) Appl. No.: 09/677,061

(22) Filed: Sep. 29, 2000

(51) Int. Cl.⁷ .......................... G06F 13/14; G06F 13/00; G06F 13/36; G06F 11/00

(52) U.S. Cl. ................... 710/305; 710/110; 710/314; 714/56; 714/41; 714/43

(58) Field of Search ................... 710/300, 305, 710/312, 315, 117, 314, 100; 709/329, 200, 232; 370/392, 401; 340/825.52; 714/47, 11, 55, 43, 758, 4; 711/200; 187/288

(56) References Cited

U.S. PATENT DOCUMENTS

| | | | | |
|---|---|---|---|---|
| 4,377,000 A | * | 3/1983 | Staab | 714/55 |
| 5,586,269 A | * | 12/1996 | Kubo | 340/825.52 |
| 5,613,090 A | * | 3/1997 | Willems | 709/329 |
| 5,884,044 A | * | 3/1999 | Marsanne et al. | 709/232 |
| 5,897,663 A | * | 4/1999 | Stancil | 711/200 |
| 5,933,591 A | * | 8/1999 | Mazzurco | 714/4 |
| 5,949,786 A | * | 9/1999 | Bellenger | 370/401 |
| 6,038,623 A | * | 3/2000 | Schutte | 710/100 |
| 6,065,135 A | * | 5/2000 | Marshall et al. | 714/11 |
| 6,145,036 A | * | 11/2000 | Barenys et al. | 710/300 |
| 6,145,102 A | * | 11/2000 | Klein et al. | 714/47 |
| 6,173,814 B1 | * | 1/2001 | Herkel et al. | 187/288 |
| 6,202,115 B1 | * | 3/2001 | Khosrowpour | 710/312 |
| 6,205,504 B1 | * | 3/2001 | Faust et al. | 710/305 |
| 6,219,691 B1 | * | 4/2001 | Youn | 709/200 |
| 6,233,635 B1 | * | 5/2001 | Son | 710/315 |

(Continued)

OTHER PUBLICATIONS

"The I²C–Bus Specification" Philips Semiconductors, Version 2.1, Jan. 2000.
The I2C–bus and how to use it, Philips Semiconductors, Apr. 1995, pps. 1–24.

*Primary Examiner*—Glenn A. Auve
*Assistant Examiner*—Christopher E. Lee
(74) *Attorney, Agent, or Firm*—Matthew J. Hodulik; James Milton

(57) ABSTRACT

The present invention is an I²C (inter-IC control) bridge device which implements a communication protocol layered on top of a standard I²C protocol. The layered protocol used by the bridge device is termed the "Layered I²C Protocol"—abbreviated "LIP". Thus the bridge device is called a "LIP bridge device". The LIP bridge device provides I²C address extension, data integrity checking, and fault detection and isolation when inserted between an I²C bus master and it's intended target I²C device. Each LIP bridge device has at least two attached I²C busses—a parent bus and a child bus. The LIP bridge operates as a slave on its parent bus, and a master of its child bus. The Layered I²C protocol is specified to operate on a bus between one or more bus masters and the parent bus of one or more LIP bridge devices. The child bus is used for attaching multiple I²C devices and/or one or more LIP bridge devices. In an exemplary implementation, the LIP bridge device is constructed using a microcontroller to create a LIP bridge device with one parent and one child I²C bus port and a group of LIP bridge configuration pins. The parent bus traffic to a given LIP bridge device consists entirely of LIP packets, and the child bus traffic consists of standard I²C packets to communicate with standard child bus I²C devices. The child bus traffic may also consist of LIP packets to communicate with LIP bridges attached to the child bus. By design, the LIP packets and standard I²C transactions do not interfere with one another. The LIP bridge device interprets LIP command packets from a bus master and translates them into the intended I²C data stream that is then broadcast over the child bus. Likewise, data from the child bus is used to create LIP packets that are returned to the proper bus master. The use of LIP packets on a given I²C bus provides an extra level of I²C addressing.

6 Claims, 13 Drawing Sheets

U.S. PATENT DOCUMENTS 6,414,956 B1 * 7/2002 Szczepanek ................ 370/392
6,467,003 B1 * 10/2002 Doerenberg et al. ........ 710/117
6,564,340 B1 * 5/2003 Odegard et al. .............. 714/43
6,618,782 B1 * 9/2003 Gulick et al. ............... 710/305
6,633,996 B1 * 10/2003 Suffin et al. .................... 714/4
6,643,727 B1 * 11/2003 Arndt et al. ................. 710/314
6,643,816 B1 * 11/2003 Uesugi et al. .............. 714/758

* cited by examiner

TYPICAL LIP BRIDGE USAGE

LIP BRIDGE INTERNAL BLOCK DIAGRAM

TYPICAL USAGE OF LIP BRIDGE

Hardware Address Strapping

The LIP Address / Function encoding within the four byte LIP packet is as follows:
Lip address The Child Address / Function Encoding is as follows:

Read Count Field

Read Data Tag

Status Byte Register Organization

FIG. 11

TABLE 8    Key to Symbols

| Symbol | Meaning |
|---|---|
| S | I²C bus start condition |
| P | I²C bus stop condition |
| A | Acknowledge |
| A | No-Acknowledge |
| LA | LIP address |
| CA | Child bus address |
| W | R/!W bit within address field is set for WRITE |
| R | R/!W bit within address field is set for READ |
| CRC | CRC byte |
| Data | Data byte |
| Count | Read count |
| Fnc(x) | Special function command "x" – where x is the function's hex code |
|  | Gray shade indicates data sent from Host Bus to LIP bridge |
|  | White indicates data sent from LIP bridge to Master |
| ..... | Zero or more instances of the preceding transaction. |

Host bus master to LIP One Byte Child Bus Write

| S | LA | W | A | CA | A | DATA | A | CRC | A | P |

160

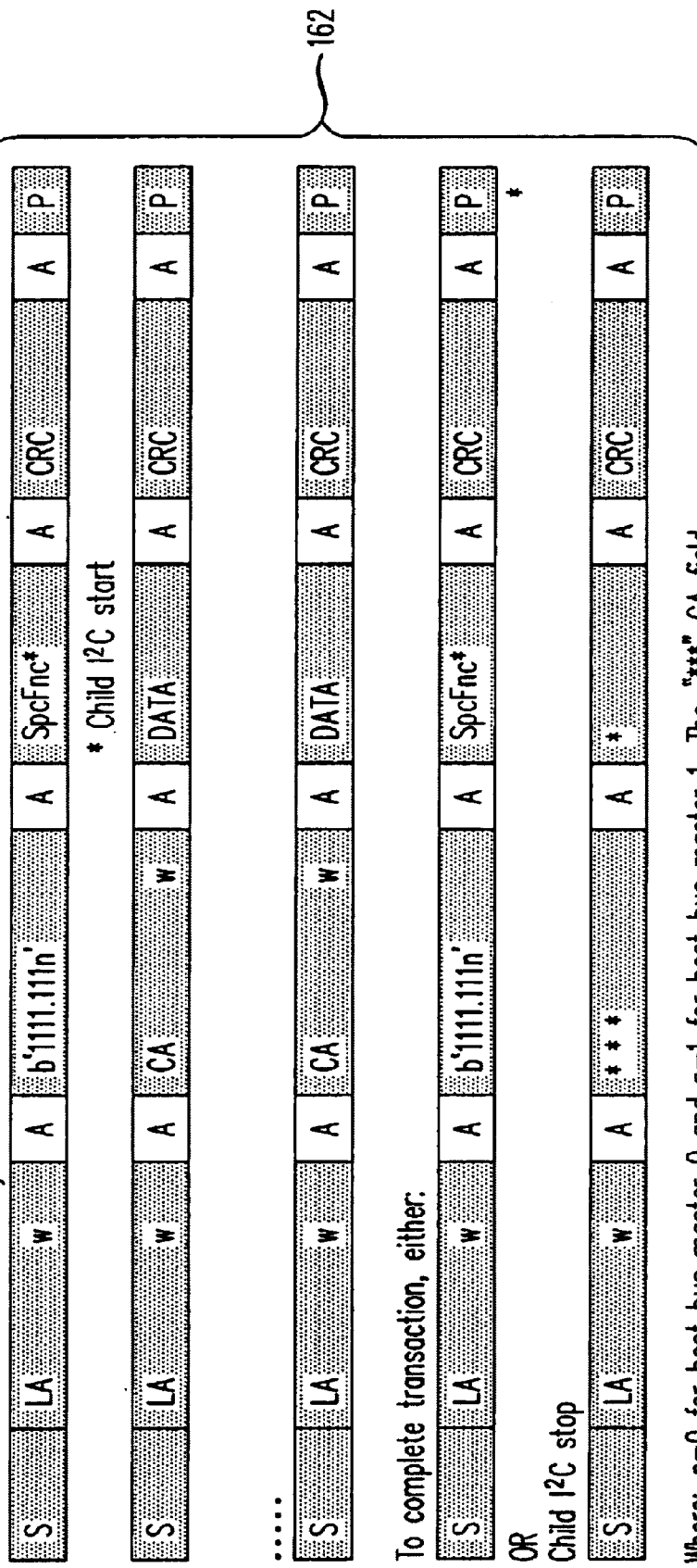

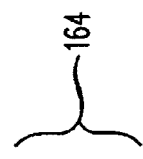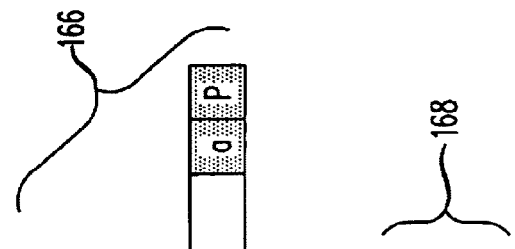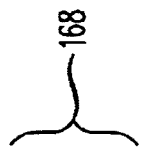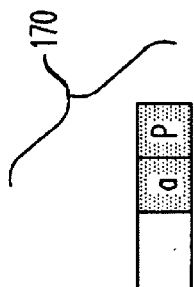

FIG. 17
PLCC

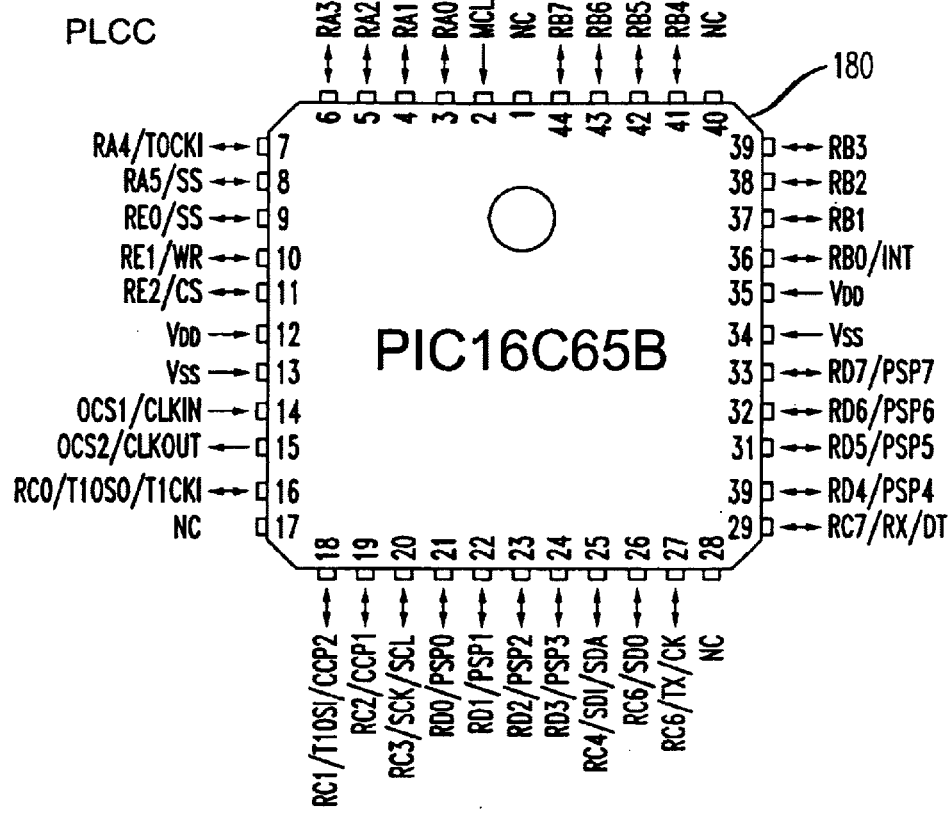

| PIN # | Label | Function |
|---|---|---|
| 2 | !MCLR | !partner_reset_in – Active low input for reset from partner UP bridge (Also VPP pin for in circuit programming) |
| 3 | RA0 | !partner_reset_out – Active low output to reset partner UP bridge |
| 20 | RC3 | UP_clk – UP bus serial clock in |
| 25 | RC4 | UP_data – UP bus serial data in/out (bidirectional) |
| 27 | RC6 | child_clk – child bus clock output |
| 29 | RC7 | child_data – child bus data in/out (bidirectional) |
| 37 | RB1 | UP_addr_parity – parity bit for UP address (strap to make odd parity) |
| 38 | RB2 | UP_addr0 – bit 0 to strap UP I²C address |
| 39 | RB3 | UP_addr1 – bit 1 to strap UP I²C address |
| 41 | RB4 | UP_addr2 – bit 2 to strap UP I²C address |
| 42 | RB5 | UP_addr3 – bit 3 to strap UP I²C address |
| 4 | RA1 | UP_addr4 – bit 4 to strap UP I²C address |
| 5 | RA2 | UP_addr5 – bit 5 to strap UP I²C address |
| 43 | RB6 | In circuit programming clock |
| 44 | RB7 | In circuit programming data |
| 6 | RA3 | child_bus_busy_out – active low open collector output when this UP bridge owns child bus (needs a 1K pull up to Vdd). |
| 36 | RB0 | child_bus_busy_in – active low input when partner UP bridge owns child bus |

FIG. 18

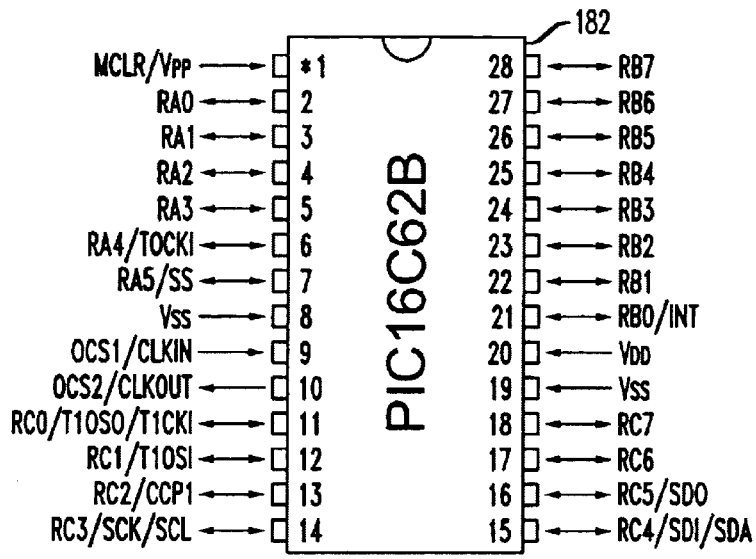

| PIN # | Label | Function |
|---|---|---|
| 1 | !MCLR | !partner_reset_in - Active low input for reset from partner UP bridge (Also VPP pin for in circuit programming) |
| 2 | RA0 | !partner_reset_out - Active low output to reset partner UP bridge |
| 14 | RC3 | UP_clk - UP bus serial clock in |
| 15 | RC4 | UP_data - UP bus serial data in/out (bidirectional) |
| 17 | RC6 | child_clk - child bus clock output |
| 18 | RC7 | child_data - child bus data in/out (bidirectional) |
| 22 | RB1 | UP_addr_parity - parity bit for UP address (strap to make odd parity) |
| 23 | RB2 | UP_addr0 - bit 0 to strap UP $I^2C$ address |
| 24 | RB3 | UP_addr1 - bit 1 to strap UP $I^2C$ address |
| 25 | RB4 | UP_addr2 - bit 2 to strap UP $I^2C$ address |
| 26 | RB5 | UP_addr3 - bit 3 to strap UP $I^2C$ address |
| 3 | RA1 | UP_addr4 - bit 4 to strap UP $I^2C$ address |
| 4 | RA2 | UP_addr5 - bit 5 to strap UP $I^2C$ address |
| 27 | RB6 | In circuit programming clock |
| 28 | RB7 | In circuit programming data |
| 5 | RA3 | child_bus_busy_out - active low output when this UP bridge owns child bus (needs a 1K pull up to Vdd). |
| 21 | RB0 | child_bus_busy_in - active low input when partner UP bridge owns child bus |

Level 1 Data Flow Diagram

Packet Parser Data Flows

Firmware I2C Data Flows

US 6,874,052 B1

EXPANSION BRIDGE APPARATUS AND METHOD FOR AN I²C BUS

FIELD OF THE INVENTION

The present invention relates generally to electronic equipment that communicates using the industry standard I²C (inter-IC control) bus. More particularly, the invention relates to an expansion device for use in connection with such a bus.

BACKGROUND OF THE INVENTION

The use of I²C (inter-IC control) devices is very popular among designers of electronic systems because the devices offer an inexpensive way to provide distributed monitoring or control of a piece of equipment using a simple two wire serial communication bus. Inexpensive I²C devices are available to monitor voltage, temperature, and other physical quantities, provide non-volatile memory, parallel IO ports, and a large variety of other specialized functions. These devices are widely used in many types of electronic equipment from consumer electronics to computer systems.

An I²C bus provides for 128 unique addresses by definition. Real world designs, however, typically contain I²C devices that use multiple I²C addresses resulting in a practical limit of closer to 1–8 devices. Since only relatively few devices can be uniquely addressed on any given two wire I²C bus, designers typically use multiple I²C busses when the addresses on a given bus are used up. The use of multiple busses increases system cost and complexity. Another shortcoming of the I²C bus is that it does not provide any features to guarantee the integrity of the data that's traveling on the bus. Accordingly, there is a need for an I²C-type bus that practically supports a greater number of addresses while also providing an amount of integrity for data traveling thereon.

SUMMARY OF THE INVENTION

The present invention is an I²C (inter-IC control) bridge device which implements a communication protocol layered on top of a standard I²C protocol. The layered protocol used by the bridge device is termed the "Layered I²C Protocol"—abbreviated "LIP". Thus the bridge device is called a "LIP bridge device". The LIP bridge device provides I²C address extension, data integrity checking, and fault detection and isolation when inserted between an I²C bus master and it's intended target I²C device. Each LIP bridge device has at least two attached I²C busses—a parent bus and a child bus. The LIP bridge operates as a slave on its parent bus, and a master of its child bus. The Layered I²C protocol is specified to operate on a bus between one or more bus masters and the parent bus of one or more LIP bridge devices. The child bus is used for attaching multiple I²C devices and/or one or more LIP bridge devices.

In an exemplary implementation, the LIP bridge device is constructed using a microcontroller to create a LIP bridge device with one parent and one child I²C bus port and a group of LIP bridge configuration pins. The parent bus traffic to a given LIP bridge device consists entirely of LIP packets, and the child bus traffic consists of standard I²C packets to communicate with standard child bus I²C devices. The child bus traffic may also consist of LIP packets to communicate with LIP bridges attached to the child bus. By design, the LIP packets and standard I²C transactions do not interfere with one another. The LIP bridge device interprets LIP command packets from a bus master and translates them into the intended I²C data stream that is then broadcast over the child bus. Likewise, data from the child bus is used to create LIP packets that are returned to the proper bus master.

The use of LIP packets on a given I²C bus provides an extra level of I²C addressing. An I²C bus provides for 128 unique addresses by definition. In many cases, real world designs, however, typically contain I²C devices that use multiple I²C addresses resulting in a practical limit of closer to 1–8 devices. By contrast each LIP bridge device uses only one I²C address and provides a child bus with 128 free addresses. Therefore LIP bridges expand the number of available addresses on the I²C bus from 128, to instead 128 multiplied by the number of LIP bridge devices, which is a maximum of 128×128=16384 I²C addresses.

In one exemplary embodiment of the invention a first transceiver is coupled to a host bus master over a parent bus, where the host bus master uses a first communications protocol. A second transceiver is coupled to target devices over a child bus, the target devices utilizing a second communications protocol. The first protocol has a bridge device address field for addressing the bridge devices and a target device address field for addressing the target devices coupled to the child bus. The number of target devices addressable by the host bus master is expandable based on the number of bridge device coupled thereto. A protocol translator is coupled to the first and second transceiver for translating communications in the first protocol destined for the target devices to the second protocol and translating communications in the second protocol destined for the bus master to the first protocol.

BRIEF DESCRIPTION OF THE DRAWINGS

A more complete understanding of the present invention may be obtained from consideration of the following detailed description of the invention in conjunction with the drawing, with like elements referenced with like references, in which:

FIGS. 11–16 show exemplary transaction structures for selected commands generated from the host bus master to LIP;

FIGS. 17–18 show pinouts for exemplary microcontrollers used to implement the present invention I²C bridge device;

DETAILED DESCRIPTION

Figure 1:
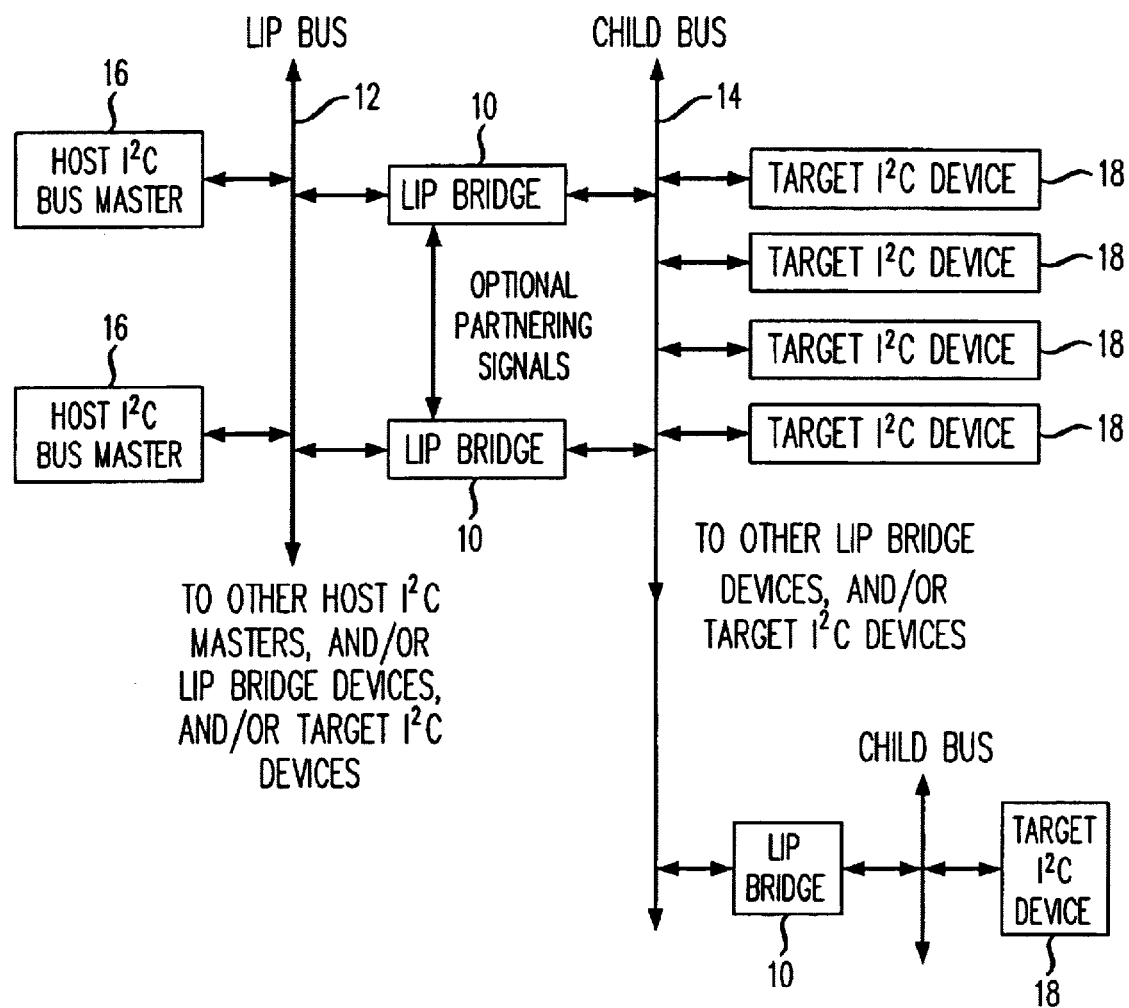
FIG. 1 is a block diagram for one application of the present invention I²C bridge device.

The present invention is an I²C (inter-IC control) bridge device which implements a communication protocol layered on top of a standard I²C protocol. The layered protocol used by the bridge device is termed the "Layered I²C Protocol"—abbreviated "LIP". Thus the bridge device is called a "LIP bridge device". The LIP bridge device provides I²C address extension, data integrity checking, and fault detection and isolation when inserted between an I²C bus master and it's intended target I²C device. Referring to FIG. 1, an illustration of a typical usage of the LIP bridge device 10 is shown. Each LIP bridge device has at least two attached I²C busses—a parent bus 12 and a child bus 14. The LIP bridge device 10 can have more than one child bus or parent bus port. The LIP bridge 10 operates as a slave on its parent bus 12, and a master of its child bus 14. The Layered I²C protocol is specified to operate on a bus between one or more bus masters 16 and the parent bus of one or more LIP bridge devices. The child bus 14 is used for attaching multiple I²C devices 18 and/or one or more LIP bridge devices 10. As shown, the LIP bridge devices can also be cascaded.

In an exemplary implementation, the LIP bridge device 10 is constructed using a microcontroller to create a LIP bridge device with one parent and one child I²C bus port and a group of LIP bridge configuration pins. The parent bus traffic to a given LIP bridge device consists entirely of LIP packets, and the child bus traffic consists of standard I²C packets to communicate with standard child bus I²C devices. As will be explained, the child bus traffic may also consist of LIP packets to communicate with LIP bridges attached to the child bus. By design, the LIP packets and standard I²C transactions do not interfere with one another. The LIP bridge device interprets LIP command packets from a bus master and translates them into the intended I²C data stream that is then broadcast over the child bus. Likewise, data from the child bus is used to create LIP packets that are returned to the proper bus master.

The use of LIP packets on a given I²C bus provides an extra level of I²C addressing. An I²C bus provides for 128 unique addresses by definition. In many cases, real world designs, however, typically contain I²C devices that use multiple I²C addresses resulting in a practical limit of closer to 1–8 devices. By contrast each LIP bridge device uses only one I²C address and provides a child bus with 128 free addresses. Therefore LIP bridges expand the number of available addresses on the I²C bus from 128, to instead 128 multiplied by the number of LIP bridge devices, which is a maximum of 128×128=16384 I²C addresses.

Figure 2:
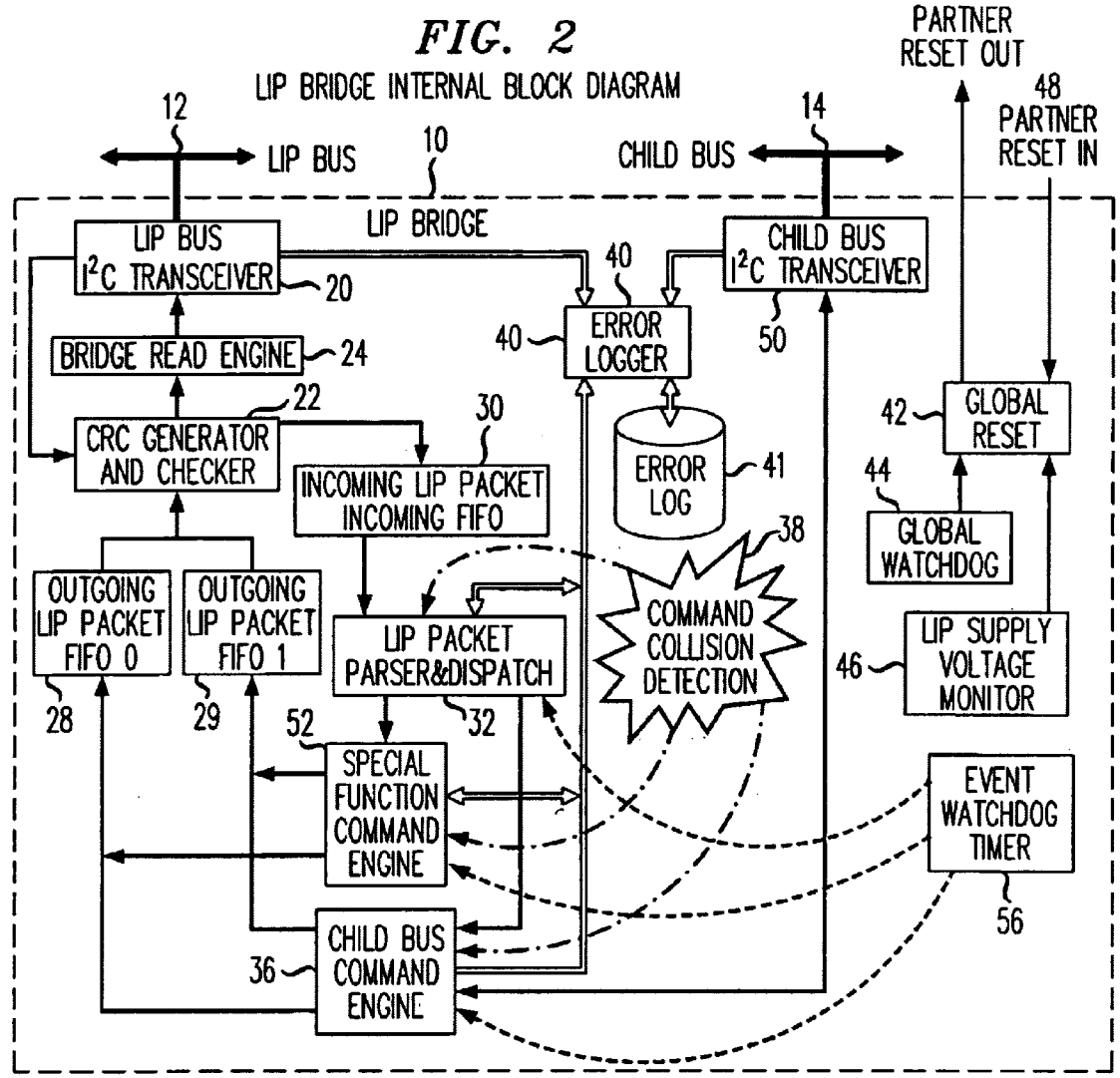
FIG. 2 is functional block diagram for one embodiment of the present invention I²C bridge device.

Referring to FIG. 2, a high-level functional block diagram of a LIP bridge device 10 is shown. The bridge device 10 couples to the LIP bus 12 via an LIP bus transceiver 20. This I²C transceiver is an I²C slave only, and responds to LIP packets addressed to the LIP bridge from a Host I²C Bus Master 16 (FIG. 1). The I²C bus master is typically an intelligent device, e.g., a microprocessor, that is responsible for gathering data and providing control via the commands issued and received o the LIP bus. The I²C transceiver 20 can also function as a slave transmitter so that the Host I²C Bus Master 16 can extract data from the LIP bridge 10. In the incoming direction the bus transceiver 20 couples to a CRC (cyclical redundancy check) generator and checker 22 which calculates a CRC code for all incoming or outgoing LIP packets. As is well known, a CRC code is a unique number that is related to the data in a mathematical way such that even a single bit change in the data will result in a different CRC code.

A bridge read engine 24 is activated by the LIP bus I²C transceiver 20 when a Host I²C Bus Master 16 wishes to extract data from the LIP bridge 10. If data is available it is tagged with information to identify the intended receiver, the data, and length. This is followed by a CRC check code so that the Host I²C Bus Master 16 can verify that the data was not corrupted during transmission. If no data is available, the bridge read engine generates a packet signifying to the Host I²C Bus Master 16 that there was no data available. Outgoing LIP packet FIFOs 28, 29 accumulate data from requests made to the LIP bridge 10 until the requesting Host I²C Bus Master 16 reads the data from the LIP bridge. There can be one or more such FIFOs, e.g., one for each Host I²C Bus Master. Although only one host bus master is required, additional benefits may be realized in system configurations including two or more I²C Bus Masters. In such configurations, data tagging and the ability to recover data obtained but transmitted unsuccessfully due to, for example, multi-master interference, become valuable.

An incoming LIP packet FIFO 30 accumulates incoming LIP packets for processing by a LIP packet parser and dispatch function 32. The LIP packet parser and dispatch mechanism 32 removes LIP packets from the Incoming LIP Packet FIFO 30, and verifies that the packet passed the CRC check. It then verifies the packet contents are a valid command and verifies that the entire packet was received within a specified time window. If all tests pass, then the command is forwarded to a command engine 36 or 52 for processing. If any tests fail, the packet is discarded and an error logged. Data from the LIP packet parser and dispatch is provided to a command collision detection unit 38.

The command collision detection unit 38 determines if multiple Host I²C Bus Masters 16 have pending commands that will result in the potential for a given master receiving the wrong data. In this case, a special packet is returned for all Host I²C Bus Master reads until the collision condition is clear. The packet informs all involved Host I²C Bus Masters 16 that their data is available, and can be obtained via a retry. An error logger 40 receives error signals from all relevant functional units, and writes the data in a standard format to an internal error log 41. Error data is preserved until it is read out by a Host I²C Bus Master, then explicitly cleared. A LIP bridge global reset unit 42 is responsible for resetting the entire state of the LIP bridge device 10 when requested. It can also render the bridge inoperative and tri-state all outputs—in case the LIP bridge has an internal failure and must be isolated so that a partner LIP bridge can function in its place. The LIP bridge global reset unit 42 receives inputs from three sources: a global watchdog timer 44, a LIP supply voltage monitor 46, and an incoming partner reset-in signal line 48. All three of these sources can cause a reset of the LIP bridge 10. In addition, if the partner reset-in signal line 48 is held asserted, it will render the LIP bridge inoperative and electrically inert by tri-stating all outputs.

The global watchdog timer 44 signals the LIP bridge global reset unit 42 if any functional unit within the LIP bridge fails to check in at a regular interval. This allows potential recovery from transient errors. The LIP supply voltage monitor 46 will signal the LIP bridge global reset unit 42 if the power supplied to the LIP bridge falls below a certain threshold. An event watchdog timer 56 is used by several functional units to time a given operation.

A child bus I²C transceiver 50 functions as an I²C master only on the child bus 14. It sends data to and receives data from I²C targets 18 attached to the child bus in response to commands from the child bus command engine 36. The child bus command engine 36 receives commands from the LIP packet parser and dispatch unit 32 to send data to or extract data from a given child bus I²C target and relays the request to the child bus I²C transceiver 50. In the case of a child bus read operation, all data received is placed into the respective outgoing LIP Packet FIFO 28, 29. If the read was unsuccessful according to the child bus I²C transceiver 50, then a formatted error packet is placed into the appropriate outgoing LIP packet FIFO 28, 29. A special function command engine receives commands from the LIP packet parser and dispatch unit 32. An extensive list of commands exists to retry operations, read and clear error log entries, query the status of the LIP bridge, perform internal tests, and modify operational characteristics of the LIP bridge. Some of these commands place data into an appropriate outgoing LIP Packet FIFO 28,29.

LIP Protocol

A unique protocol is utilized in accordance with the present invention between a host bus master, the I²C busses to which the host bus masters is connected, and target LIP bridges. The LIP bridges are the target of the messages from the host bus master. The host bus master and LIP bridges utilize LIP to communicate. LIP bridges provide electrical I²C isolation, I²C address extension, and data integrity enhancement. The electrical isolation that LIP bridges supply between the host bus master busses and the actual child I²C busses enhances overall reliability of a system.

As mentioned, the LIP bridge supports a slave-only parent bus and a master-only child bus. In an exemplary embodiment, the parent bus is handled by high performance dedicated I²C hardware within the LIP bridge microcontroller, and child bus communication is done using a firmware I²C driver with hardware assistance from the LIP bridge microcontroller. Alternately, communication on both busses could be implemented utilizing high performance hardware, or for lower cost and performance communication on both busses can be implemented predominately in firmware.

Figure 3:
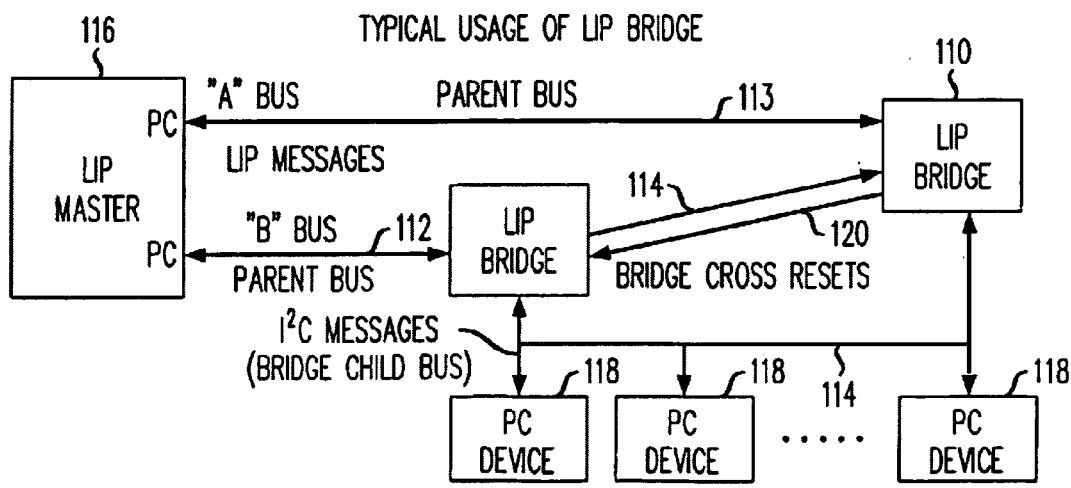
FIG. 3 is a block diagram for another application of the present invention I²C bridge device.

In another exemplary application of the present invention shown in FIG. 3, the host bus master 116 is the I²C master of A and B busses 112, 113, where two busses are utilized to provide increased data integrity. These busses make use of LIP messages, where each of these busses is connected to one or more LIP bridges 110 which act as I²C slaves. Each LIP bridge 110 has a unique programmable I²C address selected by pin strapping on the LIP bridge device. Every LIP bridge is the I²C master of the single child bus 114 to which it is connected. One or more I²C devices 118 are attached to the child bus 114, and standard I²C protocol is used to communicate to them. Bridge cross resets are used to enhance reliability by allowing each LIP bridge to reset and/or tri-state the other bridge.

An understanding of I²C communication is helpful to understanding the Layered I²C Protocol, since LIP is layered on standard I²C protocol. A description of the I²C protocol is included in "The I²C-Bus Specification" Version 2.0, December 1998, Philips Semiconductor, Version 2.1, January 2000 and "The I²C-bus and how to use it" April 1995, Philips Semiconductor, which are available at http://www-us2.semiconductors.philipscom/acrobat/various/I2C_BUS_SPECIFICATION_2.pdf, the entire content of the documents being incorporated by reference herein.

All communication between a host bus master 116 and a LIP bridge 110 takes place using the Layered I²C Protocol. Although LIP communication is bi-directional, the host bus master is always master and initiates all communication with the LIP bridge. Thus the host bus master 116 (in a manner similar to traditional I²C protocol) provides serial clock and data signals when transmitting to the LIP bridge (master transmitter), and (as master receiver) a clock for receiving messages from the LIP bridge. The LIP bridge therefore functions as an I²C slave when receiving data or slave transmitter when returning data to a host bus master. Thus, it is understood that the parent bus has the same operational characteristics as that of the standard I²C two wire bus.

Writing data from the I²C master (always the host bus master) to the I²C slave (always the LIP bridge) is initiated and carried to completion by the I²C master. Typically, the master asserts an I²C start on the bus, followed by a slave address with the write bit set. If the slave acknowledges receipt of the address, then the master can send one or more data bytes to the slave. Reception of each data byte must be acknowledged by the slave. A successful transaction is complete when the master asserts an I²C stop on the I²C bus.

When the master (host bus master) needs to read data from the slave (LIP bridge), the host bus master first writes a command to the LIP bridge to request the desired type and quantity of data the host bus master wishes to read. The master can then begin the read transaction. The read is initiated with an I²C start, followed by the slave (LIP bridge) address with the read bit set. After the LIP bridge slave acknowledges the [address+'R'] byte, the host bus master is designated a master-receiver, and the LIP bridge slave becomes a slave-transmitter. The master then clocks data out of the slave a byte at a time, until the slave has supplied the number of bytes requested by the master. After the master receives each byte, the master must provide an acknowledge bit to the slave on the ninth clock pulse. This is normally done automatically by the host bus master's hardware I²C transceiver. The transaction is completed when the master purposely signals a no-acknowledge for the last data byte it receives, and then asserts an I²C stop condition on the bus.

Figure 4:
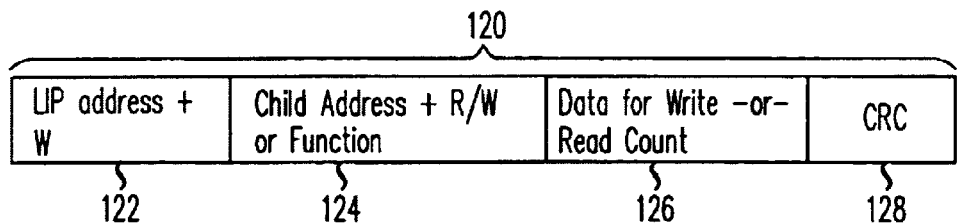
FIG. 4 illustrates the basic command structure for a command from the host bus master to the LIP bridge.

In the exemplary embodiment of the invention, a master write command from the host bus master to the LIP bridge has a four byte format 120 as shown in FIG. 3 and FIG. 4. Each request to the LIP bridge will consist of exactly four bytes. A LIP Address 122, a Child address/Function field 124, followed by one byte (data to write or a count field for reads) 126, and finally a CRC 128 for the packet.

Every packet sent to the LIP bridge must be four bytes in length. Packets which are not exactly four bytes in length are discarded, and an error is logged. The LIP bridge marks the end of a packet by sensing a start or stop on the I²C bus. The packet is discarded and an error is logged if a packet is shorter than four bytes and is not completed within a time out period or if a new packet is sent before the previous packet is complete.

The LIP bridge can return from one to fifteen bytes of data to the host bus master during a read operation plus one additional byte which is the CRC byte for the data read. If the master continues to read data past the number of bytes requested in the read count field (plus one more byte of CRC), then the LIP bridge will return the extra bytes as valid CRC values. If the master terminates the read transaction (by no-acknowledging a byte) before 'read count' bytes (plus the CRC byte) are read, then an "UNREAD_DISC" error will be logged and the remaining data will be discarded. Once the host bus master begins reading data from the LIP bridge, the host bus master has a fixed time period to clock all the data for the read transaction out of the LIP bridge. After the fixed time period, an "SLV_XMT_TIMEOUT" error will be logged, and the remaining data will be discarded.

Figure 5:
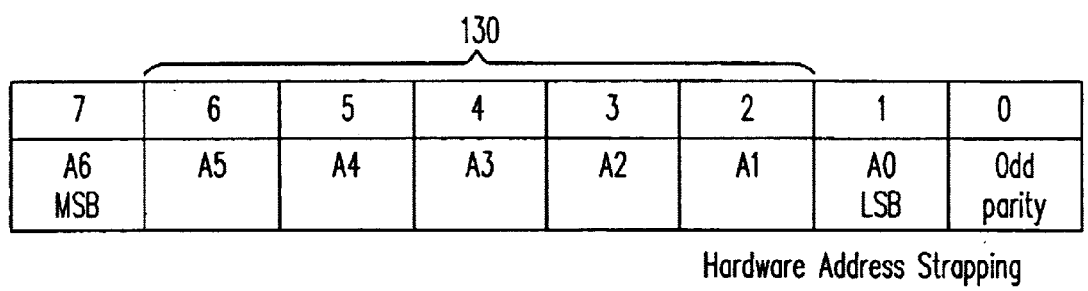
FIG. 5 shows a detailed illustration of the LIP address hardware strapping.
Figure 6:
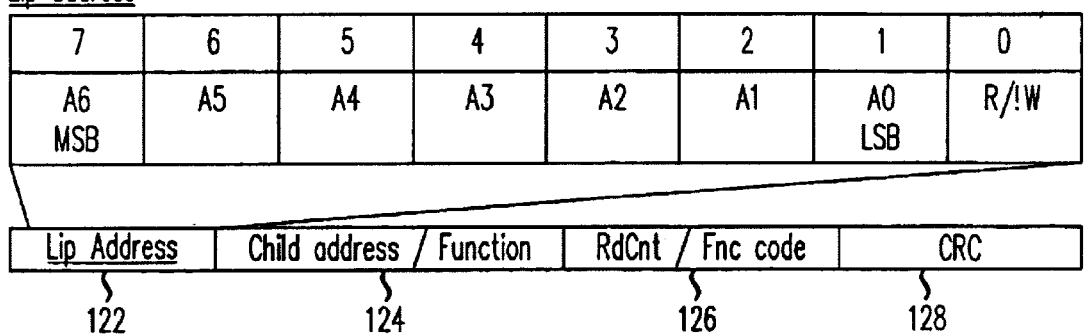
FIG. 6 shows a detailed illustration of the LIP address byte.

Each LIP bridge responds to a unique I²C address configured by strapping pins on the LIP bridge device. As will be explained herein, an exemplary bridge device will typically be incorporated within the context of a microcontroller. Other possible embodiments could include incorporation an ASIC. Moreover, the hardware requirement is small enough that the LIP bridge could occupy a reasonably small portion of a large system ASIC. Alternately, the LIP bridge could use a small fraction of the resources of a system's main processor (such as in a personal computer or an industrial controller). The hardware address strapping 130 will be assigned as shown in FIG. 5. The LIP address byte 122 (FIG. 6) identifies which LIP bridge the command packet is destined, and whether the packet describes a read or a write command. Thus there are seven bits available for addressing LIP bridges. The I²C protocol does not allow for address data protection on the bus. However, transmitted addresses are protected by the packet CRC. If the address field of the packet is corrupted, and that causes it to arrive at the wrong LIP bridge, then the LIP bridge accepting the packet will ignore the packet and log an error due to an invalid packet CRC. The LIP bridge device will have seven pins available for address strapping (plus one address parity pin to make odd parity), allowing up to 128 LIP bridges per bus. The strapping pins A0–A6 will correspond to bits 1–7 respectively in the LIP address 122 (see FIG. 6). On the parent bus during transactions, bit 0 is a Read/Write function bit pertaining to the LIP bridge addresses, in accordance with standard I²C protocol. In one exemplary embodiment, the LIP bridge will not function if the address strapping does not produce odd parity. This parity protection will normally prevent LIP bridge address contention on the LIP bus. Should multiple strapping errors defeat this mechanism, then the CRC protection on each packet will prevent data corruption in case two LIP bridges are responding to the same address. Ultimately, the CRC protection will allow the host bus master to detect the contention fault.

Figure 7:
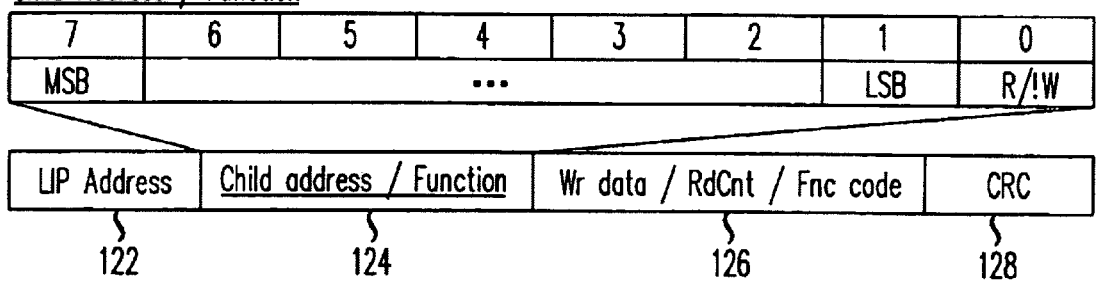
FIG. 7 shows a detailed illustration of the child address/function byte.

Referring to FIG. 7, it can be seen that the Child Address/Function byte 124 can be used for one of two purposes. As a child bus address, this byte can be used to cause an address cycle on the child bus to begin a read or write transaction to a target on the child bus. All transactions on the child bus begin with an I²C start followed by a child address. Because of the variety of target I²C devices and resulting transactions, the I²C child address may be followed by reading or writing to the target. The type of transaction (read or write) is determined by bit zero of the child address. The number of bytes written to or read from a child bus I²C target may vary depending on the target device and the transaction type.

Secondly, if the Child Address field 124 is specified as binary '1111.111x' (0xFF or 0xFE), then the entire packet is interpreted as a special function. Special functions are used to query the LIP bridge or perform specific LIP bridge operations. In the embodiment of FIG. 4, the low bit is used to identify the host bus master that is requesting the special function command. If the low bit is '0' the command is being requested by host bus master0, and if the bit is '1' the command is requested by host bus master1. The value of this bit is set by the requesting host bus master, passed through the LIP bridge, and returned in a "Read Data Tag" byte 132 (FIG. 9) if appropriate. For special function commands that return data to the host bus master, this allows the requesting host bus master to verify that the data it is reading is actually intended for it. The use of this bit by the host bus master is equivalent to the "SrcId" field of the Read Count byte sent during child bus read commands. (See FIG. 8.)

Still referring to FIG. 7, the Child Address field 124 specifies whether the child will be written to or read from. If the transaction is a 'write' then the "write data" field 126 is the data written to the child. The LIP bridge does not interpret this data—it is simply passed through. It is up to the master to issue the proper number of data bytes in the correct sequence to perform a desired operation on the child bus I²C target.

The host bus master can perform single byte writes to an I²C target on the child bus by sending one packet to the LIP bridge. The four-byte packet will contain the child address 124 and the write data 126. If a multiple byte write is not currently in progress, the LIP bridge will initiate an I²C start on the child bus, transmit the child address and write data, and issue a stop on the I²C child bus. Single byte writes are useful for simple devices such as byte wide I²C IO expanders.

Some I²C targets on the child bus require multiple bytes of data from the host bus master to perform common operations. The LIP bridge supports writing multiple bytes to a child bus target as follows. The host bus master must: 1) issue the "CHILD_I2C_START" special function command to directly cause an I²C start on the child bus; 2) issue the desired number of single byte write packets to the intended child bus target; since an I²C start was explicitly forced by host bus master, these write packets do not generate start cycles on the child bus, and only the first packet causes an address to be sent out on the child bus and 3) issue the "CHILD_I2C_STOP" special function command to directly cause an I²C stop on the child bus, or issue a write with a child address field different from the first data packet.

If not explicitly requested by the host bus master, a stop will automatically be issued on the child bus by the LIP bridge if during a multiple byte write the LIP bridge receives a packet from host bus master with a different child bus target I²C address field.

Figure 8:
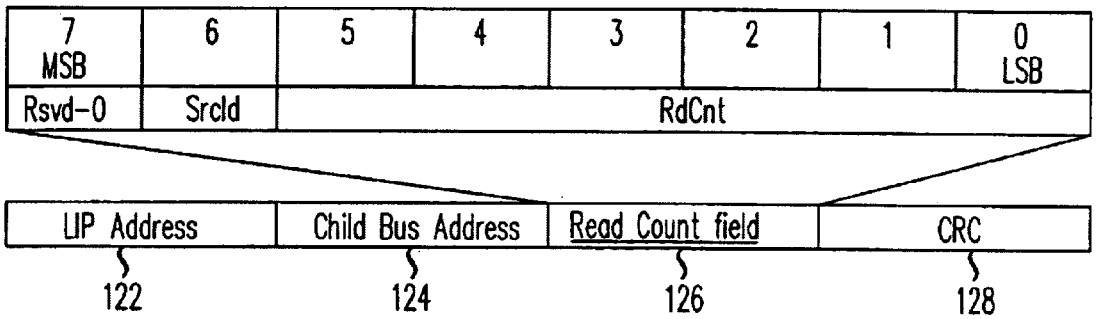
FIG. 8 shows a detailed illustration of the read count field byte.

As shown in FIG. 8, if the transaction is a child bus read, then the second byte 126 is a count field which specifies how many bytes the host bus master wishes to receive. This count field can specify from one to fifteen bytes inclusive. A count of zero or greater than 15 will cause the command to be ignored, and an error will be logged. The "RdCnt" field is six bits wide to allow for a possible future increase in read packet lengths. The "SrcId" field is a one-bit identification tag that the LIP bridge returns to the host bus master when the host bus master ultimately reads the child bus data. When submitting a child bus read request, host bus master0 should clear this bit, and host bus master1 should set this bit to '1'.

Figure 9:
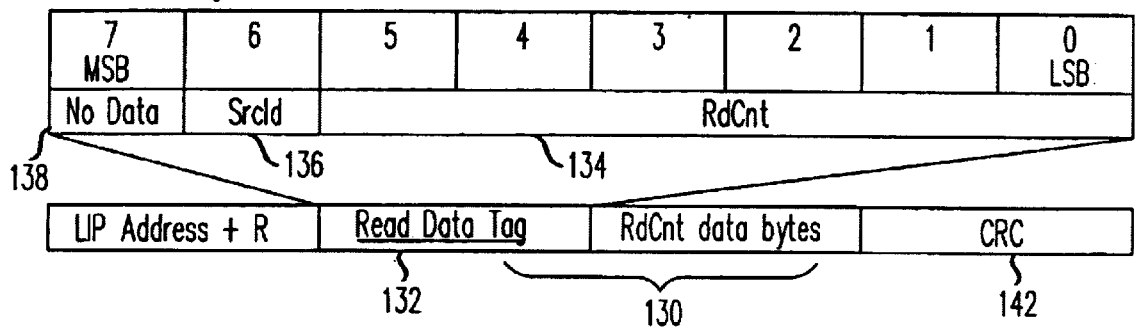
FIG. 9 shows a detailed illustration of the read data tag byte.

Referring to FIG. 9, it is illustrated that during a LIP bridge read by the host bus master, the LIP bridge returns a "Read Data Tag" byte 132 to the host bus master before actual data is returned. This is done to help a given host bus master verify that the incoming data belongs to it, is the quantity expected, and is valid data. The data indicated by reference numeral 130 is returned to the host bus master as a response to the LIP bridge read. The "Read Data Tag" byte consists of three fields. The RdCnt field 134 is the amount of data the LIP bridge is ready to return to the host bus master. This amount may differ from the "RdCnt" amount requested in the original child bus read command. The SrcId field value 136 comes from the original host bus master child bus read (or special function command) request and is '0' for host bus master0, and '1' for host bus master1. The NoData field 138 indicates if there is data available for the LIP bridge read.

TABLE 1 summarizes how to interpret the "Read Data Tag" byte.

| NoData | SrcId | RdCnt | Interpretation (and recovery) |
|---|---|---|---|
| 1 | X | 0 | The LIP bridge is responding to a LIP bridge read that was not expected, or potentially, the original request for the data was corrupt so that no data is available for a LIP bridge read. The entire transaction should be retried. |
| 1 | X | Non 0 | The LIP bridge was unable to obtain data from the Child bus for the host bus master's read request due to a child bus error. The SMC can check the LIP bridge status byte to determine if there was a child bus error or a LIP protocol violation. The entire transaction should be retried. |
| 0 | X | 1–15 | The LIP bridge obtained RdCnt bytes for the host bus master's child bus read request. The bytes can be read from the LIP bridge along with the CRC. Data will be available for the "R_LAST_CHILD_DATA_x", command should the SMC need to retry the LIP bridge read. |

TABLE 1-continued summarizes how to interpret the "Read Data Tag" byte.

| NoData | SrcId | RdCnt | Interpretation (and recovery) |
|---|---|---|---|
|  |  |  | If the SMC detects that the SrcID field is incorrect, then it has accidentally snatched the other host bus master's data. The correct data can likely be obtained by issuing the appropriate "R_LAST_CHILD_DATA_x" command. If that command results in a "no-data" return from the LIP bridge, the entire transaction should be retried. |

TABLE 1-continued summarizes how to interpret the "Read Data Tag" byte.

| NoData | SrcId | RdCnt | Interpretation (and recovery) |
|---|---|---|---|
| 0 | X | 0 | The LIP bridge is responding to a LIP bridge read during a multiple SMC read command collision. "RdCnt" field of zero indicates that all data read by SMC for this transaction will be random (invalid) with a valid CRC. The data can be recovered with the appropriate "R_LAST_CHILD_DATA_x" cmd, after a staggered timed back off to avoid another conflict. |

The child bus read command is sent by the host bus master to define the type and quantity of data the host bus master wishes to receive from the LIP bridge. Although all commands sent to the LIP bridge from the host bus master are a fixed length of four bytes, the quantity of data returned to the host bus master during a LIP bridge read is the quantity the host bus master reads out based on the read request—and can thus vary. To receive the data the host bus master must begin a new transaction on the LIP bus which consists of an I²C start, followed by the LIP address byte with the R/!W bit set (to indicate a read operation). The host bus master can then read the data it previously requested from the LIP bridge. The return data will consist of a "Read Data Tag" byte 132, followed by the amount of data 140 specified in the RdCnt field 134 of the "Read Data Tag" byte, plus one CRC byte 142.

There is a subset of commands that can not be issued between the child bus read command (or special function command prefixed by "R_") sent to the LIP bridge and the actual reading of the data (via a LIP bridge read). This restricted subset includes all commands in Table 1 prefixed by "R_", and child bus read requests. The set of safe commands that can be issued during a pending child bus read request include child bus write requests and various LIP bridge maintenance commands. Issuing any one of the restricted commands has a different effect depending on the source requester. A host bus master may also be referred to as a system master controller (SMC).

TABLE 2

| Command N | Command N+1 | Result |
|---|---|---|
| SMCx: Child bus read or special function command prefixed by "R_". | SMCx: child bus read or special function command prefixed by "R_". | The data for Command N is discarded in favor of the data for command N+1. A SNG_RD_CNFLT error is logged. The next LIP bridge read will return data for command N+1. |
| SMCx: Child bus read or special function command prefixed by "R_". | SMCy: child bus read or special function command prefixed by "R_". | Commands N and N+1 are both honored and executed. No error is logged for the collision. When SMCx and SMCy perform a LIP bridge read to extract their data:<br>1. The reads are treated as unexpected returning a "Read Data Tag" of '0'. The data stream returned will consist of a random seed followed by a stream of bytes for which the last byte will be valid CRC for the previous bytes.<br>2. SMCx and SMCy must perform a timed back off to ensure no new child bus read or special function command prefixed by "R_" is performed until all outstanding data is fully recovered.<br>3. SMCx and SMCy can recover their requested data by executing a R_LST_CHILD_DATA_IDn command, so long as no new commands overwrite the data. If the data is overwritten, an "UNREAD_DISC" error is logged. |

Beginning with the "Read Data Tag" byte and followed by all bytes from the target child I²C device, the LIP bridge will accumulate a CRC for the read transfer. The CRC is accumulated for the total number of bytes requested in the read command or for as many bytes as the child bus transfer continues, in case the child bus transfer is aborted before completion.

In a similar fashion the LIP bridge will accumulate a CRC for the data requested by any special function command which returns data to the host bus master, including the "Read Data Tag" byte. The LIP bridge makes all calculated CRCs available for immediate transmission following the last data byte. The host bus master must read one byte beyond the last requested data byte to obtain the CRC. If the host bus master fails to read the CRC byte (by terminating the read transaction before clocking out the CRC) the LIP bridge will log an "UNREAD_DISC" error. The CRC can be obtained until it is overwritten by a new CRC.

In case a LIP bridge detects a hard fault on the child bus, any child bus read transaction will return the "Read Data Tag" byte indicating an error, followed by a stream of random data bytes to the host bus master (length equal to the length requested in the original read request), and a valid CRC byte. This behavior will insure that the host bus master detects an error condition. The LIP bridge will not retry the failed child bus read operation.

Every four-byte packet to the LIP bridge concludes with a CRC byte. This byte is calculated on the first three bytes of the packet using a CRC algorithm. The LIP bridge verifies that the CRC sent by the host bus master matches the CRC it calculates for the received data. If a mismatch between the CRC's is detected, the packet is ignored, and a "BAD_CRC_IN" error is logged.

The host bus master can detect a missing LIP bridge easily. LIP bridge presence detection is best done immediately following a LIP bridge or system reset event to avoid misinterpreting an input queue overflow condition as a missing LIP bridge. If the host bus master transmits a LIP address on the LIP bus and that address byte is followed by a no-acknowledge, then there is no LIP bridge responding to that LIP address. If the LIP address is followed by an acknowledge, then a LIP bridge is present and responding to that LIP address.

The LIP bridge has an input queue for accepting packets from the host bus master. This queue has a limited depth. If the host bus master should fill the queue by transmitting packets faster than the LIP bridge can process them, then the LIP bridge will signal a queue full condition by no-acknowledging the LIP address and issuing no-acknowledge's for each byte the host bus master sends after the LIP address. This no-acknowledge signal will continue for all bytes the host bus master attempts to send to the LIP bridge until the LIP bridge has had time to clear some of the input queue. The LIP bridge will log an "input queue full" error. The host bus master can continue re-sending the packet's bytes after a short delay.

The LIP bridge saves the data portion of the last master write packet received from the host bus master. The host bus master can read back this data if desired. If after receiving a packet the LIP bridge detects a CRC mismatch with the received CRC, the packet is ignored, and an error is logged. The host bus master can query the LIP bridge for the status and/or the last data sent to the LIP bridge if there is suspicion of a problem.

LIP bus errors can be caused by momentary electrical disturbances from hot-plug events, or more serious problems such as failing hardware. The LIP bus is a two wire serial bus that electrically meets the I²C electrical specifications. The simplicity of the I²C low level protocol limits the number of errors that can happen on the bus to: 1) faults which cause one of the two bus wires to remain stuck at a logic level and 2) transient errors on the bus wires which corrupt a byte or address in transit on the bus. The errors in the first case are detectable by the host bus master. The LIP bridge functions as a slave to the host bus master and so can't reasonably detect such errors. Transient errors can affect both the host bus master and the LIP bridge.

The LIP bridge and the protocol itself are designed to provide electrical isolation, address extension, and data integrity enhancement by bridging the LIP bus and the attached child bus. The LIP bridge has no knowledge of the purpose of the data passed through it, and therefore the LIP bridge is incapable of detecting errors that involve more than one packet. The LIP bridge can only detect errors within a single master write packet from host bus master. When the host bus master is reading data from the LIP bridge (with the LIP bridge functioning as a slave transmitter) the host bus master will be able to detect LIP bus errors using the CRC supplied by the LIP bridge. Table 3 below lists high level LIP bus errors and recovery actions.

TABLE 3

| Error Type | Error Outcome | Recovery Action by host bus master |
|---|---|---|
| host bus master write to LIP bridge with corrupted four-byte command packet. | Packet CRC mismatch detected in LIP bridge, packet is ignored in LIP bridge, LIP bridge logs an error. | host bus master ultimately discovers discrepancy via cross checking or via reading LIP bridge error log. host bus master either retries operation or uses data from other LIP bridge. |
| Portion of multi-byte host bus master write to LIP bridge corrupted. | Packet CRC mismatch detected in LIP bridge, packet is ignored in LIP bridge, LIP bridge logs an error. | After completing all master writes to LIP bridge associated with multi-byte child bus write, the host bus master reads the LIP bridge error log and notes one or more errors. host bus master must reissue multi-byte transaction. |
| host bus master receives data from LIP bridge as slave transmitter, data stream is corrupted. | As a slave transmitter LIP bridge can't detect this type of error. | Upon receiving all data, host bus master determines via cross check or by checking CRC for received data that the data is corrupt. host bus master can issue R_LAST_CHILD_DATA command to recover data from a child bus target, or in the case of corrupt data from a special function command - reissue the command. |

Child Bus Arbitration

The LIP bridge is the master of the child bus it is attached to. Because in the exemplary implementation of FIG. 4, there are two LIP bridges 110 connected to each child bus 114, they must arbitrate for the child bus when there is a need to communicate with a child bus target 118. The procedure for arbitration is defined in the I²C specification and is used by the LIP bridge. Following the I²C specification in this area guarantees there will be no I²C contention on the child bus. If the two LIP bridges receive commands from the host bus master which require use of the child bus, then each LIP bridge will arbitrate for the bus, and one will win. When the bus is free following the completion of the child bus transaction, the LIP bridge which lost arbitration can try to arbitrate again. There is no priority in arbitration so each LIP bridge has an equal opportunity to win the arbitration.

An interesting property of I²C occurs when two LIP masters simultaneously start the exact same transaction on the same child bus to the same child bus target. In this case it is possible that the transaction will proceed on both LIP bridges in lockstep—with each LIP bridge thinking that it is the master for the transaction. Because of data and clock OR'ing, and the rules of data and clock toggling, this is perfectly allowable and will not degrade signal integrity or performance on the bus. It has the side benefit of guaranteeing that the host bus master will see identical data from the child bus since it was read only once from the source.

Special Function Commands

Special Function commands are used to cause the LIP bridge to perform a specific action or return to the host bus master requested data. Special functions are provided for verification of data validity and other purposes. There are several different classes of special function commands. For example, special function commands include commands neither requiring nor returning data. These commands perform a simple action within the bridge or on the child bus. Also included are commands that return data to the host bus master on a subsequent master read of the LIP bridge. These commands typically provide LIP bridge internal information or status to the host bus master. In Table 4, these commands are prefixed by "R__". In addition, special function commands are commands that require data from the host bus master before being invoked. In Table 4, these commands are prefixed by "W__".

TABLE 4

| Special Function | Hex Command Code | Comments |
| --- | --- | --- |
| Reserved | 0x00 | Reserved command |
| R_12C_ADDR | 0x01 | Returns one byte I²C address that LIP bridge is strapped to in hardware. The host bus master can use this command to verify that it is communicating with the LIP bridge it attempted to address and there are no address collisions. |
| R_TEST_PATT | 0x03 | Returns test pattern of 0xAA. The host bus master can use this command to verify access to the LIP bus. |
| R_STATUS | 0x05 | Returns LIP status byte |
| R_VERSION | 0x07 | Returns one byte LIP version number. This number should be used by host bus master to track LIP capabilities. |
| R_LIP_ERRLOG | 0x09 | Returns error log for LIP bus |
| R_CHILD_ERRLOG | 0x0B | Returns error log for child bus |
| R_LAST_DATA_BYTE | 0X0D | Return last "write data" field from command packet. Returns one byte - last data sent. |
| R_LAST_CRC | 0x0F | Return last calculated CRC. Returns one byte. |
| R_DUMP_LIP_RAM | 0x11 | Returns all LIP memory bytes from address 0–191. This is for diagnostic or error logging purposes only. |
| R_LST_CHILD_DATA_ID0 | 0x13 | Return all data LIP bridge gathered from last child bus read command issued by source ID 0. |
| R_LST_CHILD_DATA_ID1 | 0x15 | Return all data LIP bridge gathered from last child bus read command issued by source ID 1. |
| CLEAR_CHILD_ERRLOG | 0x02 | Rearm and clear error data from child bus error log. Also updates LIP status byte. |
| CLEAR_LIP_ERRLOG | 0x04 | Rearm and clear error data from LIP bus error log. Also updates LIP status byte. |
| CHILD_12C_START | 0x06 | Perform I²C start on child bus. Used to initiate multi-byte write. |
| CHILD_12C_STOP | 0x08 | Perform I²C stop on child bus. Used to end multi-byte write. |
| ENABLE_BAD_CRC | 0x0A | Cause all calculated CRC's returned to host bus master to be incorrect. Mode stays enabled for all transactions until mode is disabled again. This is for diagnostic purposes only. |
| DISABLE_BAD_CRC | 0x0C | Send correct CRC data to host bus master for all transactions. This is the power on/reset default. |
| RESET_LIP_SELF | 0x0E | Reset this LIP bridge. |
| RESET_LIP_PARTNER | 0x10 | Reset partner LIP bridge. |
| HOLDRST_LIP_PARTNER | 0x12 | Assert then hold partner LIP bridge in reset. The partner LIP bridge will be held in reset. Partner reset can be released by issuing a RESET_LIP_PARTNER command. This command is useful in case the host bus master suspects that the partner LIP bridge has gone bad, and needs to be held off the child I²C and LIP busses. |
| NOP | 0x14 | Does nothing. During tramsmission by the host bus master, the LIP bridge will acknowledge each byte of the packet. Upon successful reception of a valid NOP command, the command is ignored. No state within the LIP bridge is changed. This command is intended to provide a method for the host bus master to detect that a LIP bridge is present, without the need to read data back from the LIP bridge (as with R_TEST_PATT, etc.). A BAD_CRC_IN error will be logged if the CRC is bad for NOP command packet. |
| Reserved for future use. | 0x14, 0x16, 0x17–xFF | |

LIP Bridge Status Byte

Figure 10:
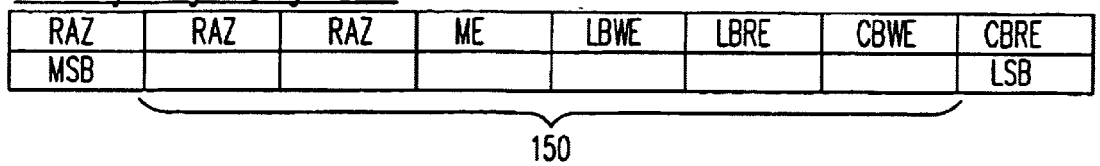
FIG. 10 shows a detailed illustration for an exemplary embodiment of the status byte register.

Referring to FIG. 10, the LIP bridge status byte 150 contains a one byte summary of the most important aspects of LIP bridge health. The host bus master has read only access to this status byte. Following any type of LIP bridge reset or power cycle, the value of all status bits within the byte is zero. Status Bit Descriptions are as follows: RAZ— "read as zero" indicates a bit reserved for future use that will return a zero if read. CBRE—Child Bus Read Error indicates the LIP bridge has detected and logged an error on its child bus during a read operation to a child bus target by the LIP bridge. The first error that occurs is logged and locked in the child bus error log. The details of the error can be obtained by issuing the "R_CHILD_ERRLOG" special function command. Issuing the "CLEAR_CHILD_ERRLOG" command will clear and rearm the error log, and also this status bit. CBWE—Child Bus Write Error. The LIP bridge has detected and logged an error on its child bus during a write operation by the LIP bridge to a child bus target. The first error that occurs is logged and locked in the child bus error log. The details of the error can be obtained by issuing the "R_CHILD_ERRLOG" special function command. Issuing the "CLEAR_CHILD_ERRLOG" command will clear and rearm the error log, and also this status bit. LBRE—LIP Bus Read Error indicates the LIP bridge has detected and logged an error on the LIP bus during a read from the LIP bridge by the host bus master. The first error that occurs is logged and locked in the LIP bus error log. The details of the error can be obtained by issuing the "R_LIP_ERRLOG" special function command. Issuing the "CLEAR_LIP_ERRLOG" command will clear and rearm the error log, and also this status bit LBWE—LIP Bus write Error indicates the LIP bridge has detected and logged an error on the LIP bus during a write to the LIP bridge by the host bus master. The first error that occurs is logged and locked in the LIP bus error log. The details of the error can be obtained by issuing the "R_LIP_ERRLOG" special function command. Issuing the "CLEAR_LIP_ERRLOG" command will clear and rearm, the error log, and also this status bit. ME—Multiple errors bit indicates that the LIP bridge has encountered more than one instance of one or more of the error types, and so some amount of error history will be available via the "R_LIP_ERRLOG" and "R_CHILD_ERRLOG" commands. The ME bit will automatically clear when both error logs are cleared.

LIP Bridge Error Logs

Table 5 illustrates an exemplary structure that is returned in response to the host bus master requesting error information for the LIP bus or the child bus. One structure is maintained for the LIP bus, and one for the child bus. The log's data bytes are sent in the numbered order given below. All fields are cleared by executing the "rearm and clear error" command for a given bus. If any logged error fields contain error data (and are thus locked against any changes), then a clear operation will rearm them to accumulate errors again. The table lists the byte ordering, an abbreviation for the error log field, and a description of the data in the field.

TABLE 5

| Order | Name | Description |
|---|---|---|
| 1 | NUM_ERR | Number of errors accumulated following a "rearm and clear error" command for a particular bus (child or LIP), or any type of LIP bridge reset. |

TABLE 5-continued

| Order | Name | Description |
|---|---|---|
| 2 | W_ERR1 | Error code for first latched error associated with a master write operation to the bus. |
| 3 | W_ERR1_CA | Child bus address (if any) associated with first latched write error, or zero if a child bus address was not involved. |
| 4 | W_ERR1_CMD | Special function command code or child bus "Read Data Tag" associated with first latched write error. |
| 5 | R_ERR1 | Error code for first latched error associated with a master read operation from the bus. |
| 6 | R_ERR1_CA | Child bus address (if any) associated with first latched read error, or zero if a child bus address was not involved. |
| 7 | R_ERR1_CMD | Special function command code or child bus "Read Data Tag" associated with first latched read error. |
| 8 | ERR2 | Second latched error code. |
| 9 | ERR3 | Third latched error code. |

LIP Bridge Error Codes

The LIP bus and the LIP bridge's child bus each have a dedicated error log with the structure given in Table 5, and error codes in Tables 6 and 7. After the first error is stored, that part of the error log is locked from further change and one or more bits are set in the "LIP bridge status byte" as appropriate. Following the initial error of a given type (read or write) there is space in the error log for two additional errors codes. These are used to log an error code if the initial error log entry of a given type (read or write) is full. This allows for logging one read and/or one write error plus two more error codes for the each bus. When all entries in an error log are filled, subsequent error information will be lost. Any error will cause the appropriate bit in the LIP bridge status byte to be set and locked. Error data is entirely cleared in a given error log by executing the appropriate clear command for the error log. The clear command also rearms the error log to receive data again, and clears the appropriate bit (or bits) in the LIP status register. Note that LIP bus errors and general LIP bridge errors fall into the numerical range of 0x1–0x80, while child bus errors are numbered from 0x80–0xFF. This allows the two types of errors to be distinguished in the ERR2 and ERR3 fields of the error log.

TABLE 6

LIP Bus Errors

| | | |
|---|---|---|
| NO_ERROR | 0x00 | No Error present |
| BAD_CMD | 0x01 | Command written to LIP bridge did not consist of correct four byte packet. Command was ignored. |
| BAD_READ_CNT | 0x02 | Invalid 'read count' field in a read command packet. The 'read count' field was outside the range of 1–15 bytes inclusive. |
| BAD_CRC_IN | 0x03 | CRC check failed on incoming command, command was ignored. |
| QUEUE_FULL | 0x04 | Input queue full, LIP bridge acknowledged LIP address and then no-acknowledged subsequent incoming data bytes. |
| RCV_TIMEOUT | 0x05 | Receive timeout. The time between the reception of the LIP address to the reception of the fourth command byte exceeded time limit. Command was ignored. |
| WATCHDOG_RST | 0x06 | Watch dog reset. An internal error occurred in the LIP bridge which caused the watch dog timer to hard reset the LIP bridge. All internal state has been reset, a stop has been issued to the child bus, and any commands in process have been lost. |
| INTERNAL_ERR | 0x07 | Internal error. An unspecified internal error has occurred within the LIP bridge. |
| UNREAD_DISC | 0x08 | Unread data discarded. The host bus master read less data from the LIP bridge than it requested in the 'read count' field of the command packet and/or failed to read the extra CRC byte, by terminating the read transaction early with a no-acknowledge on a data byte from the LIP bridge. The remaining data and/or CRC are discarded. |
| READ_OVERRUN | 0x09 | Read overrun error. The host bus master read more data from the LIP bridge than it requested as part of a read or special function command. The extra data is returned as random data with a valid CRC. |

TABLE 6-continued

LIP Bus Errors

| | | |
|---|---|---|
| BROWN_RESET | 0x0A | Brown Out reset. A drop in supply voltage caused the LIP bridge to reset. |
| RSVD_CMD_ERR | 0x0B | Reserved command error. The host bus master requested execution of a special function command with a reserved command code. The command was ignored. |
| DUMP_INCOMP | 0x0C | RAM Dump incomplete. The LIP bridge was unable to return all 192 bytes of RAM to the host bus master following a DUMP_LIP_RAM command. Either the host bus master no-acknowledged the data before fully sent, or the transaction took longer than 50 mS. |
| XMT_TIMEOUT | 0X0D | Slave transmission timeout. The time elapsed since the host bus master clocked out the first byte of data during a LIP bridge read exceeded the bridge slave transmit time-out before the CRC byte was clocked out, indicating an incomplete LIP bridge read. |
| SNG_RD_CNFLT | 0x0E | Single host bus master Read Conflict. A single given host bus master issued two consecutive commands to the LIP bridge (and mix of child bus read or special function command prefixed by "R_") before reading the data from the first command. |
| MULT_RD_CNFLT | 0x0F | Multiple host bus master Read Conflict. host bus masterx issued a child bus read or special function command prefixed by "R_", and before host bus masterx performed a LIP bridge Read to extract the data, host bus mastery issued a child bus read or special function command prefixed by "R_". |
| UNEXPECTED_RD | 0x10 | The LIP bridge received a LIP bridge read when there was no data available for transmission to the host bus master. This could occur if the original read request was corrupted or otherwise lost or dropped, resulting in no data available for the subsequent LIP bridge read. |
| | 0x11–0x80 | Reserved |

TABLE 7

Child Bus errors

| | | |
|---|---|---|
| CHILD_SCL_SL | 0x81 | I²C clock line stuck at logical zero. This is a hardware fault, or possibly a long glitch from a hot plug event. |
| CHILD_SCL_SH | 0x82 | I²C clock line stuck at logical one. This is a hardware fault, or possibly a long glitch from a hot plug event. |
| CHILD_SDA_SL | 0x83 | I²C data line stuck at logical zero. This is a hardware fault, or possibly a long glitch from a hot plug event. |
| CHILD_SDA_SH | 0x84 | I²C data line stuck at logical one. This is a hardware fault, or possibly a long glitch from a hot plug event. |
| CHILD_ADDR_NOACK | 0x85 | No response from I²C target (no-acknowledge from address cycle) |
| CHILD_DATA_NOACK | 0x86 | Target no-acknowledged data transfer. |
| CHILD_ARB_ERR | 0x87 | LIP bridge could not obtain access to the child bus from the other LIP bridge. |
| | 0x88–0xff | Reserved |

CRC Algorithm

A CRC Algorithm is used to calculate all CRC's within the LIP bridge. It is a property of the CRC algorithm that if the last byte processed is the transmitted CRC, then the resulting calculated CRC will always be zero if there has been no transmission error. Any non-zero value would indicate a transmission error. The algorithm is capable of detecting: 1) any odd number of errors anywhere within the packet (i.e. −1, 3, 5, 7 . . . bit errors), 2) all double-bit errors anywhere within packet, 3) any cluster of errors that can be contained within an 8-bit "window" (1–8 bits incorrect) and 4) most larger clusters of errors.

The CRC calculation can be represented by a linear shift register with feedback taps given by the polynomial $X^8+X^5+X^{4+1}$. This can be implemented in software by a loop construct or a table lookup. The loop implementation produces compact code (about instructions), but uses about 150 machine cycles to execute. The table implementation uses more code space (300 bytes or more) but is much faster (perhaps 10–20 machine cycles). Consult "Technical Aspects Of Data Communication, Third Edition, McNamara" for theory and implementation of several different types of CRC algorithms and further references on CRC's in general.

Exemplary Transactions

Now that the basic structure of the LIP bridge device and its accompanying protocol have been described, the following illustrates some typical transactions between the host bus master and the LIP bridge. The byte ordering in the packets below is first byte to last byte from left to right. Within each byte, the bits are ordered MSB to LSB from left to right. In all of the transaction samples, note that the "acknowledge/no-acknowledge" bit is provided by the I²C interface hardware automatically. In fact, for most hardware implementations, it is not possible to modify or prevent the proper use of this bit. It is shown in the transactions for completeness.

FIG. 11 illustrates a host bus master to LIP One Byte Child Bus Write 160 and Table 6 illustrates the symbol key for FIGS. 11–16. The host bus master uses this transaction to issue a one-byte write to a target on the child IC bus. This transaction is useful for writing to any I²C target requiring one byte, such as a byte wide I²C parallel expander. This transaction will cause the following sequence on the child bus:

1. Arbitrate for child bus
2. IC start
3. Address the I²C device on the child bus specified by the child address
4. Write the data from the data field
5. I²C stop Note that the child bus is not released by the LIP bridge until the entire transaction is complete. The transaction may cause any of the following errors to be logged: 1) LIP errors—Bad command, CRC check failed, receive timeout, input queue full and 2) Child errors—All FIG. 12 illustrates a host bus master to LIP Multi-Byte Write 162. The host bus master can use this transaction to issue one or more bytes of writes to a target on the child I²C bus. Any number of bytes (greater than one) can be sent to a child bus target this way, assuming the target device will accept them. This command is useful for child bus I²C targets requiring more than one byte, such as 16 bit parallel I²C expanders, and EEPROM devices.

If it is essential for the data to arrive at the I²C target on the child bus intact, the host bus master can check the LIP status byte after the transmission to insure the transaction was error free. Reading back the data sent between data packets will interrupt this transaction, and should not be done. This transaction will cause the following sequence on the child bus:
1. Arbitrate for child bus
2. I²C start
3. Address the I²C device on the child bus specified by the child address
4. Write the data from the data field of subsequent single byte write packets until the CA field no longer matches that of the first single byte write packet
5. I²C stop Note that the child bus is not released by the LIP bridge until the entire transaction is complete.

The transaction may cause any of the following errors to be logged: 1) LIP errors—Bad command, CRC check failed, receive timeout, input queue full, reserved command error and 2) Child errors—All FIG. 13 illustrates a Special Function Action Neither Requiring Nor Returning Data 164. The host bus master uses this transaction to invoke a special function action that neither requires nor returns data. Execution of commands that perform an action can be verified by reading the LIP status byte. The LIP status byte will indicate if there are any errors latched. Some examples of this command type are: CLEAR_LIP_ERRLOG, CLEAR_CHILD_ERRLOG, CHILD_I2_START, CHILD_I2_STOP, All ENABLE_, DISABLE_ commands, and all RESET commands.

The transaction may cause any of the following errors to be logged: 1) LIP errors—Bad command, CRC check failed, receive timeout, input queue full, reserved command error and 2) Child errors—I²C bus stuck-at errors.

FIG. 14 illustrates a Special Function Action Returning Data 166. The host bus master uses this transaction to invoke a special function action that returns data. Explicitly verifying execution of these commands is not necessary, since they return data Failure to return data would be the failure indicator, however any errors encountered by the LIP bridge are logged. All such commands are prefixed by "R_" in Table 1. Some examples of such a command: R_VERSION, R_STATUS, R_LST_CHILD_DATA_ID0 (returns multiple bytes), R_LIP_ERRLOG, R_CHILD_ERRLOG (returns multiple bytes).

When issuing the special function request, the issuing host bus master identifies itself to the LIP bridge via the low bit of the Child Bus address/Special function field. This identification is passed through the LIP bridge, and returned to the host bus master as part of the "Read Data Tag".

The host bus master should clock out the "Read Data Tag" byte, followed by the number of data bytes that the requested special function command provides, plus one CRC byte. The special function will provide one or more bytes of data depending on the requested command. If the host bus master continues to clock data out past the proper amount, then each extra data byte returned will be valid CRC for the previous bytes, and a "READ_OVERRUN" error will be logged. Note that the host bus master can check the "Read Data Tag" field to verify that the data it is receiving was actually intended for it by checking the "SrcId" bit. Additionally, the "RdCnt" field can be used to further identify the read transaction. If the "NoData" bit is set then there is no data available for this read transaction, and the R_LST_CHILD_DATA_IDn command can not be used for recovery. This could be the result of a child bus error.

The transaction may cause any of the following errors to be logged: LIP errors —Bad command, CRC check failed, receive timeout, input queue full, unread data discarded, read overrun, reserved command error FIG. 15 illustrates a Special Function Action Requiring Data 168. The host bus master uses this transaction to invoke a special function action that requires data. This capability is provided for possible future use, it is currently not a part of the exemplary embodiment. The transaction may cause any of the following errors to be logged: 1) LIP errors—Ill: formed command, CRC check failed, Receive timeout and 2) special function errors—Reserved command error FIG. 16 illustrates a host bus master Child Bus Read Via LIP Bridge Action. The host bus master should use this transaction to read data from a child bus I²C target. Any preparation of child bus I²C target for a read operation must be done before the child bus read is requested. For example, if the child bus I²C target is a particular address within an EEPROM device, then the appropriate commands for setting the EEPROM address must be sent before the read transaction is requested.

Following transmission of the child bus read request, the host bus master must perform a LIP bridge read. The host bus master should clock out the "Read Data Tag" byte, followed by the number of data bytes specified in the RdCnt field, plus one CRC byte. This can be from three to seventeen bytes inclusive. If the host bus master continues to clock data out past the proper amount, then the extra bytes returned will be valid CRCs, and a "READ_OVERRUN" error will be logged. Note that the host bus master can check the "Read Data Tag" field to verify that the data it is receiving was actually intended for it by checking the "SrcId" bit. Additionally, the "RdCnt" field can be used to further identify the read transaction. If the "NoData" bit is set then there is no data available for this read transaction, and the R_LST_CHILD_DATA_IDn command can not be used for recovery. This could be the result of a child bus error.

This transaction will cause the following sequence on the child bus:
1. I²C start.
2. Address the I²C device on the child bus specified by the child address and request a "read" transaction type.
3. Read data from the child bus I²C device until the count specified in the Read Count field is reached, or until an error prevents further reading.
4. I²C stop.

The transaction may cause any of the following errors to be logged: 1) LIP errors—Bad command, CRC check failed, receive timeout, input queue full, Unread Data Discarded, Read Overrun, bad read count and 2) Child Bus Errors—All.

LIP Bridge Microcontroller

The LIP bridge can be implemented using one of several microcontrollers, for example, those made by Microchip Technology Inc. There are several devices which are optimal for LIP bridge use. These devices have a hardware I²C interface that will facilitate excellent performance. Exemplary microcontrollers 180, 182 with their associated pin outs are shown in FIGS. 17–18.

Figure 19:
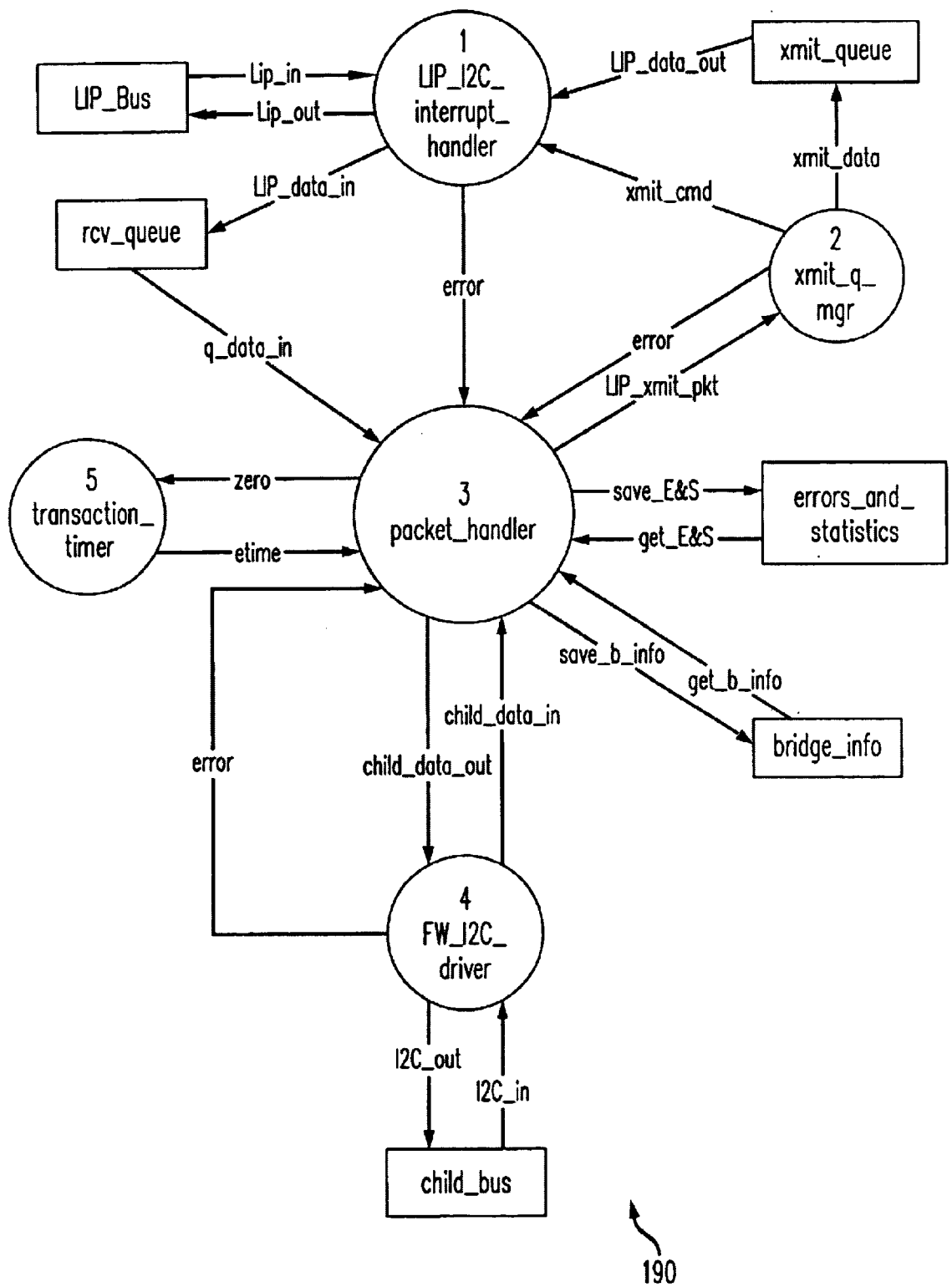
FIGS. 19–21 show exemplary data flows for various levels of firmware used in connection with the I²C bridge.
Figure 20:
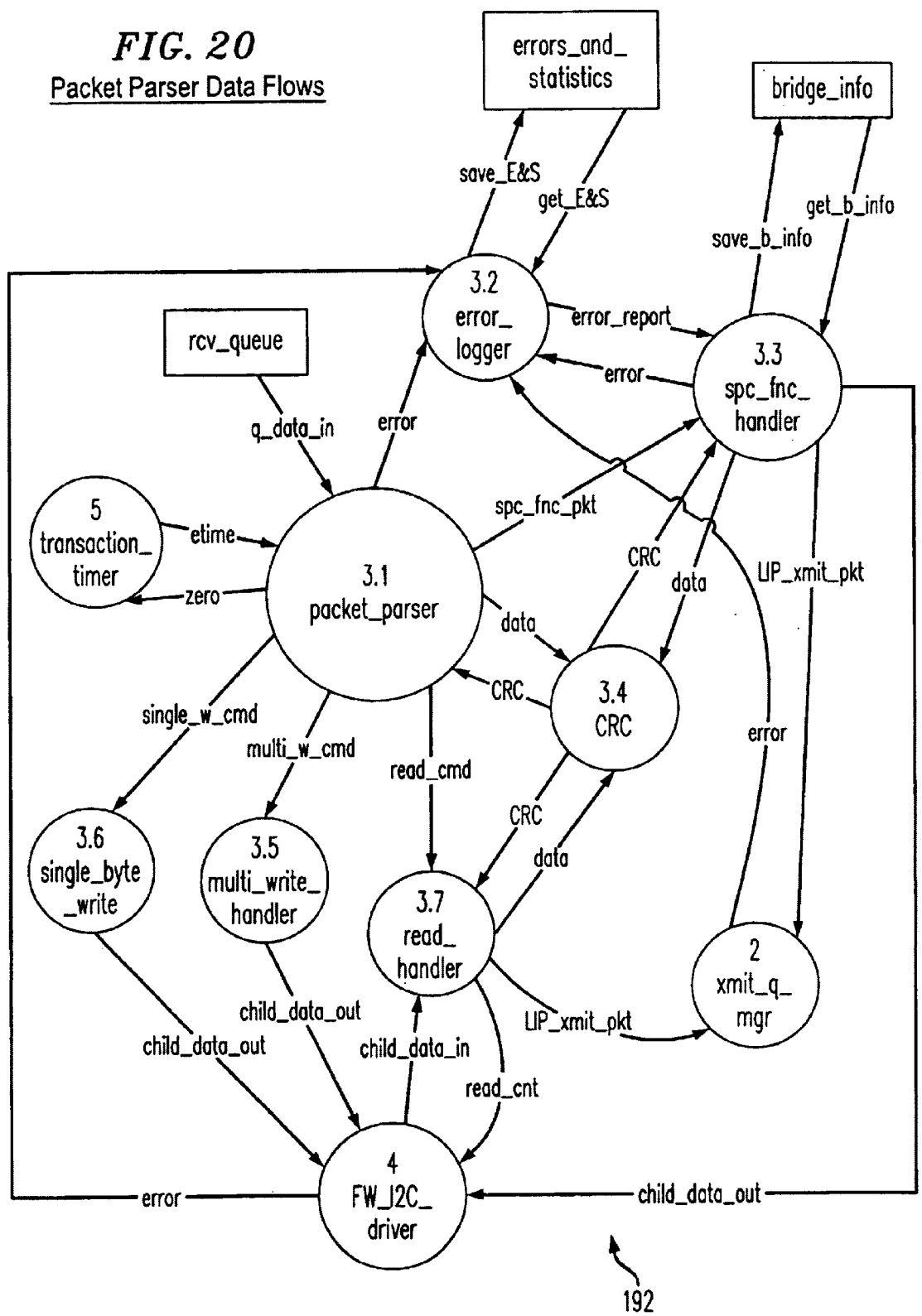
Figure 21:
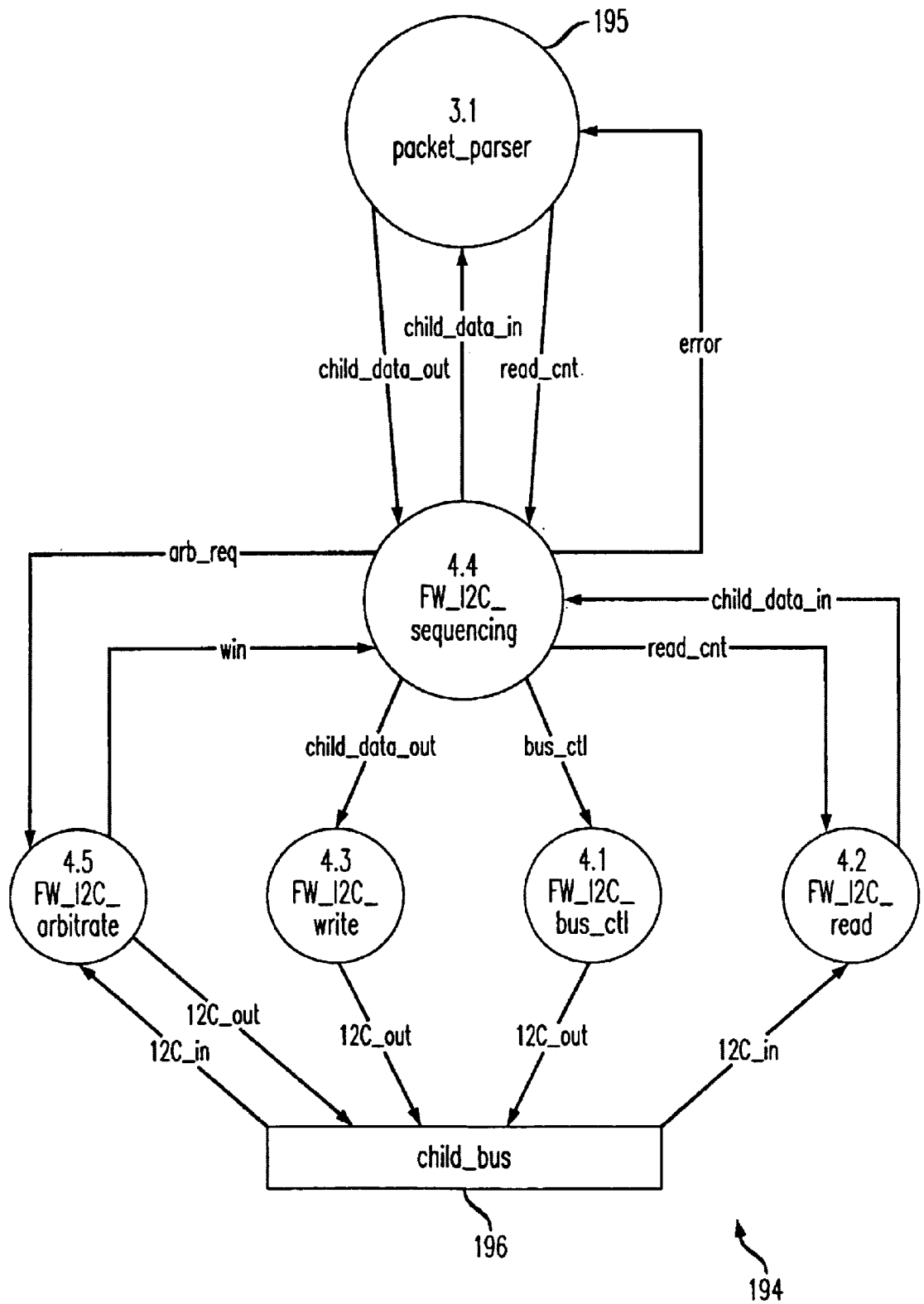
Figure 22:
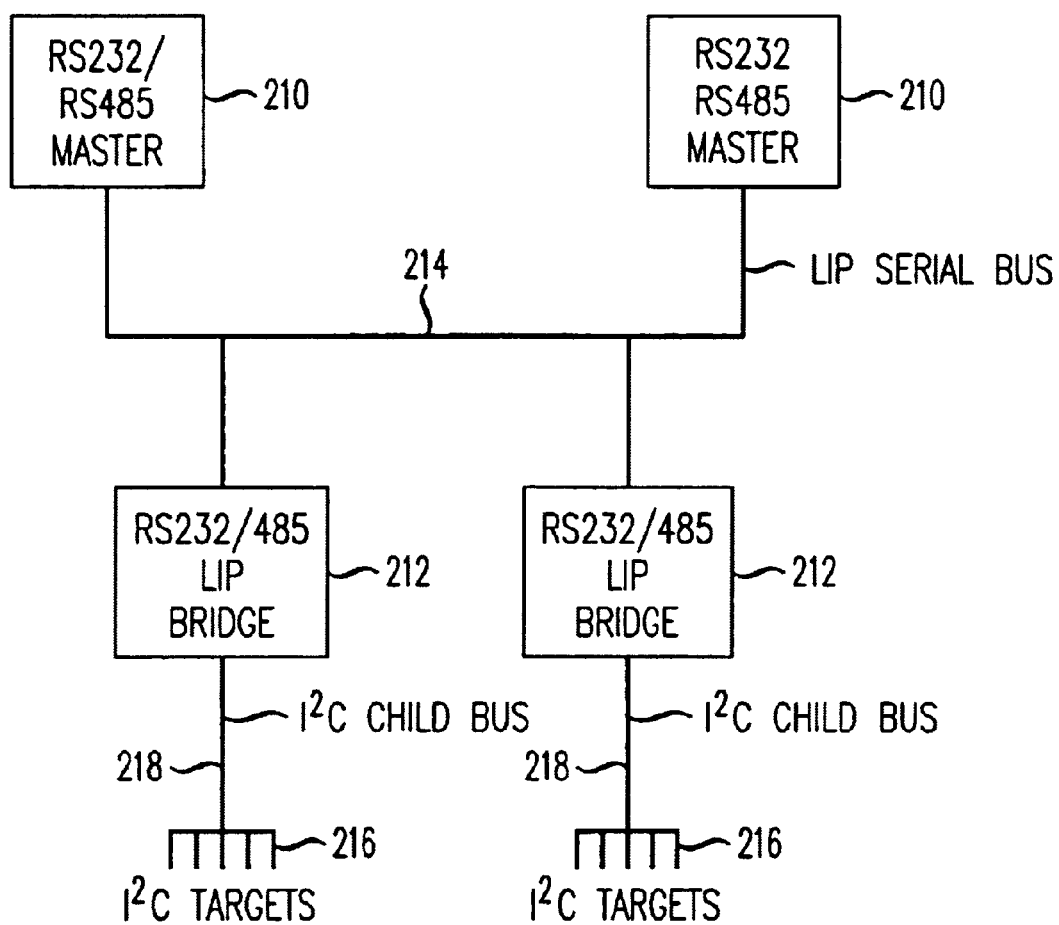
FIG. 22 shows an exemplary embodiment for an expansion bridge using an alternate parent bus.

Referring to FIGS. 19–21, in connection with FIG. 2, a design overview of some of the basic firmware required to implement the I²C bridge device is shown. FIG. 22, for instance shows a flow diagram 190 for the packet handler 191 and associated devices which couple between the LIP bus and child bus. FIG. 23 illustrates data flows 192 for the packet parser 193 and its associated devices. FIG. 24 illustrates the I²C data flows 194 between the packet handler 195 and child bus 196.

The LIP bridge of the present invention overcomes a shortcoming of I²C in an environment where there are multiple I²C bus masters accessing one or more slave targets. In this environment, when two bus masters attempt to read data from the same slave target, it is impossible for the slave to know which I²C master is performing the read operation. There are many instances when this can result in a given I²C master receiving data intended for another I²C master, which can cause significant problems. The LIP bridge tags all data waiting to be read so that a given I²C master can verify that the incoming data is intended for it, or if not to discard the data and retry the operation.

Whenever a LIP bridge device is inserted between an I²C master and it's target I²C device(s), the LIP bridge device provides fault detection and isolation capabilities that result in a solution with greater reliability. For example, consider two designs.

A. I²C master connected to 64 target I²C devices which monitor eight equipment bays.
B. I²C master connected to 8 LIP bridge devices (one per equipment bay), with each LIP bridge connected the eight target I²C devices in an equipment bay.

Consider any of the following common faults that could occur:
1. Target I²C device fails, and renders I²C bus unusable.
2. An electrical connector, wiring, or power fault in an equipment bay causes bay failure and renders the child side I²C bus unusable.
3. The equipment is exposed to electrical interference, causing corruption of data flowing to and from the I²C master.

If faults one or two occurred, design "A" would completely fail, while design "B" could continue to function at a reduced capacity due to the ability to detect then isolate the failure behind a LIP bridge device. If fault three occurred, design "A" would completely fail, while design "B" would continue to operate by making use of the data integrity checking. If data integrity checks were frequently failing, the equipment's operator could be notified to rectify the problem.

To provide a high availability solution, each LIP bridge device has hardware and firmware features that allow it to self-monitor it's own operation and take corrective action when possible or at least report potential problems. In addition, availability is greatly enhanced with the ability to partner a LIP bridge device with a second LIP bridge device to serve the same master and set of target I²C devices. Partnering LIP bridges provides redundancy in case of LIP bridge failure, and takes advantage of partnering signals so that each LIP bridge device can reset or disable the other LIP bridge device to isolate it in case of failure. Partnering additionally allows the host to cross check data provided by the partner LIP bridge, as a technique to virtually guarantee data integrity.

The LIP bridge device invention solves several problems inherent in the use of I²C busses. The device:
1. Expands the number of I²C addresses available on a single level I²C bus by a factor of 128. Cascading LIP bridges into multilevel busses expands available addresses by 128*128.
2. Provides data integrity checking, data transmission reliability, and correct recipient guarantee.
3. Identifies data during read operations so that the requester can verify it is receiving the correct data.
4. Provides high availability and fault detection and isolation.
5. Provides the ability to partner LIP bridges to add hardware redundancy for extremely high availability and confidence in data integrity.

For many computer systems (including PC's and especially servers), communication/network equipment (switches, routers, etc), office machines, and industrial machines—the customer values the equipment's ability to monitor and report faults or be managed and controlled remotely even if the equipment is unattended or even locked away. Designers must provide an inexpensive method of supplying these competitive features that ensures data integrity and is itself a reliable component. The invention meets these goals by allowing the use of inexpensive I²C devices to provide monitoring and control functions over a single cost effective I²C bus, while achieving high availability and guaranteed data integrity.

In addition, the use of I²C which uses a serial clock an data line as a transmission medium is not required, and this technology could be implemented on another information bus such as RS232, RS485, SPI, etc. An illustration of such an arrangement is shown in FIG. 22. FIG. 22 shows an RS232/RS485 bus master 210 which couples to an appropriate RS232/RS485 LIP bridge 212 through a LIP serial bus 214 carrying LIP protocol over an RS232 or RS485 electrical medium rather than I²C. RS485 and RS422 in particular, can be used over longer distances, compared to I²C. Target devices 216 are coupled to the bridge device 212 over an I²C bus 218 in the manner previously described.

The foregoing description merely illustrates the principles of the invention. It will thus be appreciated that those skilled in the art will be able to devise various arrangements, which, although not explicitly described or shown herein, embody the principles of the invention, and are included within its spirit and scope. For example in certain high precision, low fault tolerant applications, the host bus master performs every child bus read operation on two different LIP bridges to ensure data integrity of the LIP bridge. Also, a LIP bridge can include more than one parent bus or child bus ports. Multiple child busses can allow greater economy with a reduction in redundancy—for instance, the accessing of more I²C addresses per dollar. In addition, multiple parent busses utilized with one child bus allow the bridging of two systems together while providing all the benefits of an individual bridge. An example of such an application is remote management capability by two servers of a large disk drive rack. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims.

What is claimed is:

1. A system comprising:

at least one host bus master operable to utilize a first communications protocol for communicating over a parent bus; and at least two LIP bridge devices, each LIP bridge device including, a first transceiver coupled to said host bus master over said parent bus, said host bus master utilizing said first communications protocol;

a second transceiver coupled to target devices over a child bus, said target devices utilizing a second communications protocol, said first communications protocol having a bridge device address field for addressing said bridge devices and a target device address field for addressing said target devices coupled to said child bus;

said at least two LIP bridge devices being coupled to said parent bus and said child bus, said at least two LIP bridge devices being operable to transmit messages between said host bus master and said target devices, each of said at least two LIP bridge devices being partnered to the other LIP bridge device, said host bus master being operable to use said at least two LIP bridge devices to determine if transactions through a particular LIP bridge are corrupted, said host bus master being operable to cross check data provided by each of said at least two LIP bridge devices to verify integrity of data received from said target devices, and each of said at least two LIP bridge devices being adapted to use partnering signals to reset the other LIP bridge device to isolate faults.

2. The system of claim 1, wherein said host bus master is operable to hold a failed interconnected LIP bridge device in a reset state in which said failed interconnected LIP bridge device is electrically removed from said child bus.

3. The system of claim 2, wherein said host bus master clears errors in said failed interconnected LIP bridge device with reset commands.

4. The system of claim 3, wherein said host bus master is operable to access any target device on said child bus via any LIP bridge device connected to said parent bus and said child bus.

5. The system of claim 4, wherein said host bus master performs every child bus read operation on each of said at least two LIP bridge devices to ensure data integrity.

6. The system of claim 5, wherein each of said at least two LIP bridge devices are adapted to use partnering signals to disable the other LIP bridge device to isolate faults.

* * * * *